United States Patent
Chan et al.

[11] Patent Number: 5,870,625
[45] Date of Patent: Feb. 9, 1999

[54] NON-BLOCKING MEMORY WRITE/READ MECHANISM BY COMBINING TWO PENDING COMMANDS WRITE AND READ IN BUFFER AND EXECUTING THE COMBINED COMMAND IN ADVANCE OF OTHER PENDING COMMAND

[75] Inventors: Cheng-Sheng Chan, Hsinchu; Tienyo Pan, Taipei, both of Taiwan

[73] Assignee: Industrial Technology Research Institute, Hsinchu, Taiwan

[21] Appl. No.: 570,441

[22] Filed: Dec. 11, 1995

[51] Int. Cl.$^6$ .................................................. G06F 9/312
[52] U.S. Cl. ............................................. 395/825; 395/840
[58] Field of Search ................................ 711/3, 117, 151, 711/143, 120, 5; 395/825, 840, 826

[56] References Cited

U.S. PATENT DOCUMENTS

| | | | |
|---|---|---|---|
| 3,771,137 | 11/1973 | Barner et al. | 711/120 |
| 5,008,808 | 4/1991 | Fries et al. | 395/826 |
| 5,224,214 | 6/1993 | Rosich | 395/859 |
| 5,333,276 | 7/1994 | Solari | 395/561 |
| 5,379,379 | 1/1995 | Becker et al. | 711/3 |
| 5,404,480 | 4/1995 | Suzuki | 711/117 |
| 5,517,660 | 5/1996 | Rosich | 771/117 |
| 5,524,220 | 6/1996 | Verma et al. | 395/383 |
| 5,524,235 | 6/1996 | Larson et al. | 711/151 |
| 5,553,265 | 9/1996 | Abato et al. | 711/143 |
| 5,627,993 | 5/1997 | Abato et al. | 711/143 |

*Primary Examiner*—Thomas C. Lee
*Assistant Examiner*—David Ton
*Attorney, Agent, or Firm*—Proskauer Rose LLP

[57] ABSTRACT

A computer system is disclosed which has a plurality of masters, such as a processor, a cache memory or an I/O device controller. Read response time from the main memory is minimized by a read-from-write scheme which gives priority to read commands. If a read command is to access data with the same address of a previously issued but pending write command in the buffer of a memory controller, then the read and write commands are combined and the read/write command is given priority over each other pending read or write command. To further reduce mean read response time, the data to be written to the main memory is transferred directly from the buffer to the master which issued the read command contemporaneously with the execution of the write command on the main memory.

15 Claims, 16 Drawing Sheets

NON-BLOCKING MEMORY WRITE/READ MECHANISM BY COMBINING TWO PENDING COMMANDS WRITE AND READ IN BUFFER AND EXECUTING THE COMBINED COMMAND IN ADVANCE OF OTHER PENDING COMMAND

RELATED APPLICATIONS

The following patent applications are assigned to the assignee hereof and contain subject matter related to the present application:

1. U.S. patent application Ser. No. 08/320,520, entitled "Transfer Labeling Mechanism for Multiple Outstanding Read Requests on a Split Transaction Bus" filed on Oct. 7, 1994, for Shih-Chieh WANG, Kang-Wei CHANG, and Jiahn-Jung CHEN, now U.S. Pat. No. 5,659,707.
2. U.S. patent application Ser. No. 08/071,721, entitled "Memory Consistent Pre-Ownership Method and System for Transferring Data Between an I/O Device and a Main Memory" filed on Jun. 4, 1993 for Chang-Lun CHEN, Allen S. C. WANG, and Wei-Wen CHANG, now abandoned.
3. U.S. patent application Ser. No. 08/321,205, entitled "Efficient Fault Tolerant Memory Consistent Reflection Scheme" filed on Oct. 7, 1994 for Shih-Chieh WANG, Wei-Wen CHANG and Lu-Ping CHEN, now U.S. Pat. No. 5,615,334, and
4. U.S. patent application Ser. No. 08/413,807, entitled "Non-Blocking Peripheral Access Architecture" filed on Mar. 28, 1995 for Shih-Chieh WANG, Wei-Wen CHANG and Zen-Dar HSU, now pending. The contents of the above-identified patent applications are incorporated herein by reference.

FIELD OF THE INVENTION

The present application relates to transferring information between a main memory and a plurality of masters, such as a cache memory or processor in a computer system. In particular, the present invention relates to a method and mechanism to minimize the memory response times of read operations to one or more of the masters in a multi-master system.

BACKGROUND OF THE INVENTION

A computer system 10 illustrated in FIG. 1. The computer system 10 comprises processors or central processing units (CPUs) 12-1 to 12-n, cache memories 13-1 to 13-n, an I/O device 14, such as a disk memory, a system bus 16, an I/O bridge 17, a main memory 18 and a memory controller 19. Each of these devices 12-1 to 12-n, 13-1 to 13-n, 14, 15, 16, 17, 18 and 19 is explained below.

The main memory 18 is for storing data and is typically formed by one or more dynamic random access memory integrated circuits (DRAMs). Such DRAM main memories 18 are relatively inexpensive. The main memory 18 typically has a memory array of storage locations. Each storage location can store a data word of a fixed length, e.g., eight bit long or byte long data words. Each storage location has a unique identifier, called an address, which is used in data access, i.e., read and write, commands for specifying the particular storage location from which data should be read or into which data should be written. Illustratively, the storage locations are further organized into data line storage locations for storing fixed length (e.g., thirty-two byte long), non-overlapping, contiguous blocks of data called data lines. Each data line storage location has a unique line address, similar to the aforementioned addresses, for specifying a particular data line storage location in data line accesses (i.e., reading and writing data lines). The purpose of the data lines is described below.

The various devices 12-1 to 12-n, 13-1 to 13-n, 17 and 19 making up computer system 10 are interconnected by a system bus 16. The system bus 16 is for transferring information in the form of data, addresses and commands between devices. The system bus 16 can be viewed as comprising a set of wires that transmit signals which are interpreted as commands and data by the various devices. The system bus 16 includes a data bus for transferring data, a command bus for transferring commands and addresses, and an arbitration bus. The system bus 16 is a shared resource; each of the devices attempt to utilize the system bus at one time or another for purposes of transferring data, addresses or commands. Sometimes, more than one device contends to utilize the system bus 16 at the same time. However, only a limited number of processors illustratively can utilize the system bus 16 at one time. For instance, only one device may transmit data on the data bus at one time (although it may be possible for two devices to accept data from the data bus simultaneously). To resolve this contention, the computer system 10 is provided with an elaborate arbitration protocol for allocating the system bus 16, in a fair and orderly manner, to each device contending to use it. Illustratively, data is transmitted on the system bus 16 in 16 byte packets at a clock speed of 33 MHz.

The CPUs 12-1 to 12-n are for executing program instructions. Examples of instructions are: arithmetic or logical operations on data; program flow control instructions for ordering the execution of other instructions; and memory access commands. In the course of executing these instructions, the processors 12-1 to 12-n may issue data access, i.e., data read and data write, commands. The program instructions themselves are stored as data in the main memory 18. Illustratively, the CPUs may be microprocessors such as Intel®'s Pentium™ or Motorola®'s Power PC 604™ with a clock speed of up to 133 MHz.

The cache memories 13-1 to 13-n are small, relatively high speed memories for maintaining a duplicate copy of data stored in the shared main memory 18. Cache memories are typically formed by high speed static random access memory integrated circuits (SRAMs). For instance, note that the DRAMs of the main memory 18 may have a data access clock speed of no more than about 16.7 MHz whereas the SRAMs of the cache memories 13-1 to 13-n may have a data access clock speed of 30 MHz up to the clock speed of the CPU chips (assuming the cache memory 13-1 to 13-n is incorporated onto the same chip as the CPUs 12-1 to 12-n). The cache memories 13-1 to 13-n may also be part of the integrated circuit of the CPUs 12-1 to 12-n. As cache memory is considerably more expensive than the slower main memory, the size of each cache memory 13-1 to 13-n is typically much smaller than the size of the main memory 18. Despite their relatively small size in comparison to the main memory 18, the cache memories dramatically reduce the need to access data from the main memory 18. This is because cache memories 13-1 to 13-n exploit temporal and spatial locality of reference properties of processor data accesses. Temporal locality of reference is the tendency of processors 12-1 to 12-n to access the same data over and over again. The temporal property arises from program flow control instructions such as loops, branches and subroutines which cause the processors 12-1 to 12-n to repeat execution of certain recently executed instructions. Spatial locality of reference refers to the tendency of processors to access data having addresses near the addresses of other recently accessed data. The spatial property arises from the sequential nature of program instruction execution, i.e., the processor tends to execute instructions in the sequential order in which they are stored as data. In addition, memory references to non-instruction data tend to be localized to a lesser degree. For instance, non-instruction data tends to be stored in tables, arrays and frequently and repeatedly accessed variables. Thus, the CPUs 12 tend to access repeatedly the data stored in the same localities in memory.

In order to exploit the locality of reference property, cache memories typically store an entire data line corresponding to a recently accessed data. Consequently, the likelihood increases that the cache memories 13-1 to 13-n can satisfy future accesses to data not yet accessed (assuming that future accesses will be to other data corresponding to the data lines already stored in the cache memories 13-1 to 13-n).

The cache memories 13-1 to 13-n work as follows. When the corresponding processor, e.g., the processor 12-1, issues a data access command, the associated cache memory 13-1 determines if it possesses the data line that contains the particular desired data. If so, a read or write (depending upon whether the processor issued a read or write command) "hit" is said to occur and the cache memory 13-1 satisfies the processor data access using the copy of the data within the cache memory 13-1. If the cache memory 13-1 does not contain the designated data, a read or write "miss" is said to occur. In the event of a read or write miss, the cache memory 13-1 issues a command for reading the data line corresponding to the designated address from the main memory 18 via the system bus 16. In response to receiving the read command, the main memory 18 retrieves the data line stored therein at the particular line address and transfers this retrieved data line via the system bus 16 to the cache memory 13-1. The cache memory 13-1 stores the data line transferred from the main memory 18 and then continues as if the appropriate data line were already present in the cache memory 13-1.

Cache memories 13-1 to 13-n must maintain the consistency of the data in the main memory 18. That is, while a cache memory 13-1 to 13-n may modify its copy of the data, the counterpart copy of the cache memory's data in the main memory 18 must invariably be accordingly modified. According to one memory consistent manner of operating a cache memory (e.g., the cache memory 13-1) called write through, the cache memory 13-1 immediately attempts to update the counterpart copy in the main memory 18 whenever the processor 12-1 modifies the cache memory's 13-1 copy of the data. This manner of operating the cache memory 13-1 is disadvantageous because the cache memory 13-1 must continually use the system bus 16 to access the main memory 18 each time the associated processor 11-1 modifies the data.

In order to reduce the demands on the slow main memory 18 and system bus 16, the cache memories 13-1 to 13-n operate in a manner called "write back." According to this manner of operation, each cache memory 13-1 to 13-n defers updating or writing back the modified data line until a later time. For instance, if the cache memory, e.g., the cache memory 13-1, runs out of storage space, the cache memory 13-1 may write back a modified data line to provide an available storage space for an incoming data line. Alternatively, as described in greater detail below, the cache memory 13-1 may write back a data line when another device attempts to read that data line.

The I/O bridge 17 interconnects the system bus 16 and I/O expansion bus 16'. One or more I/O devices 14, such as Ethernet interfaces, FDDI interfaces, SCSI interfaces, disk drives, etc., are connected to the I/O expansion bus 16'.

The purpose of the I/O bridge 17 is to "decouple" the system bus 16 and the I/O expansion bus 16'. Typically, data is transmitted in different formats and at different speeds on these two busses 16 and 16'. For instance, data may be transmitted in sixteen byte packets on the system bus 16 at 33 MHz while data is transmitted in four byte groups at 8 MHz on the I/O expansion bus 16'. The I/O bridge 17 may receive data packets from a device, e.g., the processor 12-1, connected to the system bus 16, and temporarily store the data of these packets therein. The I/O bridge 17 then transmits the received, "depacketized" data in four byte groups to an I/O device 14 on the I/O expansion bus 16'. Likewise, the I/O bridge 17 may receive and temporarily store data from an I/O device 14 via the I/O expansion bus 16'. The I/O bridge 17 then transmits the received data in packets to a device, e.g., the main memory 18, connected to the system bus 16.

As noted above, the processors 12-1 to 12-n, the cache memories 13-1 to 13-n and the I/O bridge 17 must operate in a manner that maintains the consistency of the data in the main memory 18. This is complicated by the "write back" scheme employed in the computer system 10. For instance, suppose a first cache memory 13-1 modifies a copy of a data line of the main memory 18 but does not write the data line back to the main memory 18. If a second cache memory 13-2 issues a command to read the same data line, the second cache memory 13-2 should receive a copy of the modified data line in the first cache memory 13-1, not the stale copy stored in the main memory 18.

To this end, the devices of the computer system 10 implement an ownership protocol. Before a device may access particular data, the device must successfully "claim ownership" in the corresponding data line. A device which does not successfully claim ownership in a data line cannot access the data corresponding thereto.

Illustratively, the ownership protocol is implemented as follows. Suppose the I/O bridge 17 desires to access a particular data line. For instance, when the I/O device 14 desires to write data to the main memory 18, the I/O bridge 17 must claim ownership in the data lines stored in the destination addresses of the data to be written by the I/O device 14. (In fact, before an I/O bridge 17 can receive each datum to be written from the I/O device 14 to the main memory 18, the I/O bridge 17 must own the corresponding data line.) The I/O bridge 17 first issues a command for claiming ownership in the particular data line on the system bus 16. This ownership claiming command may simply be a command to read or write the particular data line. Each device that can own a data line monitors or "snoops" the system bus 16 for ownership claiming commands. After issuing the ownership claiming command, the I/O bridge 17 also monitors the system bus 16 for a specified period. If another device currently owns the data line for which the I/O bridge 17 issued the ownership claim, this device may issue a response as described below. If, during the specified period, the I/O bridge 17 does not detect a response from another device indicating that another device already owns the data line, the I/O bridge 17 successfully claims ownership of the data line.

Suppose that, at the time the I/O bridge 17 issues the ownership claiming command, a cache memory 13-2 already owns, but has not modified the data line.

Illustratively, the cache memory 13-2 detects the command issued by the I/O bridge 17. In response, the cache memory 13-2 illustratively concedes ownership of the data line to the I/O bridge 17. To that end, the cache memory 13-2 simply marks its copy of the cache line invalid. At a later time, if the cache memory 13-2 desires to access data corresponding to this data line, the cache memory 13-2 must first claim ownership in the data line and successfully obtain a fresh copy of the data line.

Alternatively, the cache memory 13-2 may mark the data line shared if the I/O bridge 17 indicates (from the ownership claim issued by the I/O bridge 17) that it does not desire to modify the data. Furthermore, the cache memory 13-2 issues a command to the I/O bridge 17 indicating that the data line is shared. Two or more devices can share ownership in a data line provided that none of the sharing devices has any intention of modifying the data line (that is, each sharing device wishes to read the data but not write the data). If one of the sharing devices later wishes to modify the data, that device issues an ownership claiming command which causes the other sharing devices to concede exclusive ownership to the device issuing the ownership command claim.

Suppose that, at the time the I/O bridge 17 issues the ownership claim, the cache memory 13-2 already owns, has modified, but has not yet written back the data line in which the I/O bridge 17 attempts to claim ownership. In this case, the cache memory 13-2 first issues an intervention command on the system bus 16. The cache memory 13-2 then writes back its modified copy of the data line to the main memory 18.

In response to detecting the intervention command, the I/O bridge 17 can do one of a number of things. The I/O bridge 17 can reissue its ownership claiming command at a later time after the cache memory 13-2 has relinquished control of the data by writing the data back to the main memory 18. Alternatively, the I/O bridge 17 may utilize a "snarfing" process described below for simultaneously receiving the data at the same time the data is written back to the main memory 18. These alternatives are illustrated in FIGS. 2 and 3. In FIGS. 2 and 3:

C indicates the issuance of commands by the cache memory 13-2,

I/O indicates the issuance of commands by the I/O bridge 17,

CS# (Command Strobe) indicates when a valid command is transmitted on the command bus of the system bus 16, CMD is the command signal transmitted on the command bus of the system bus 16, DS# (Data Strobe) indicates when valid data is transmitted on the data bus of the system bus 16, ADDR is the address transmitted with the command signal, DATA is the data returned by the device (e.g., the shared memory 14) in response to the command, SLD# (Selected) is a signal transmitted by the selected recipient device of the command signal upon receiving the command therein, CDS# (Cache Data Shared) is a signal instructing an ownership claim command issuer to mark the data line shared. This signal may be transmitted by a device which snoops an ownership claim to an unmodified line stored therein, CDM# (Cache Data Modified) is a signal instructing an ownership claim command issuer that another device already owns and has modified the data. This signal is transmitted by a device which snoops an ownership claim to a modified data line stored therein, CAN# (Command Acknowledge Negative) is a signal indicating that the recipient of the command is busy serving a previous command and that the command issuer should retry its command later, ORD# is a signal indicating that a memory subsystem intends to transfer data to some processor, CAE# (Command Address Error) is a signal indicating that either the command or address issued by the command issuer had a protocol, encoding or parity error, DPE# (Data Parity Error) indicates that data received from the command issuer had a parity error, and OOR# (Out of Order Response) is a signal instructing a read command issuer that the data requested by the issued read command will be transmitted out of order, i.e., in an arbitrary order in relation to the read command, on the data bus of the system bus 16.

FIG. 2 is a timing diagram showing various signals generated during a first alternative memory transfer scheme. In FIG. 2, during cycle one of the system clock SCLK, the I/O bridge 17 issues a command for claiming ownership in a data line. This command is detected by the cache memory 13-2 which issues, on cycle four, the signals CDM# and CAN# indicating that it already owns, has modified, but has not yet written back the data line in which the I/O bridge 17 attempted to claim ownership. (The main memory 18 also responds with the SLD# signal to indicate it received the command. However, this event is insignificant as the CDM# and CAN# signals cause the main memory 18 to abort transmitting data to the I/O bridge 17.) The cache memory 13-2 then issues a write command on cycle six and writes back the modified data line on cycles nine to twelve.

Meanwhile, in response to the CAN# signal, the I/O bridge 17 illustratively reissues its ownership claim on cycle six. The cache memory 13-2 detects this command and issues the CAN# signal on cycle nine to "negatively acknowledge" the command of the I/O bridge 17 (indicating that the command was not acknowledged). Subsequently, the cache memory 13-2 issues a write command on cycle 8 and writes back the data to the main memory 18 via the data bus of the system bus 16 on cycles nine to twelve. Finally, on cycle eleven, the I/O bridge 17 successfully issues its ownership claiming command. Assuming the I/O bridge 17 issues a read command, the data is returned to the I/O bridge 17 via the data bus of the system bus 16 on cycles seventeen to twenty (not shown).

In the process illustrated in FIG. 2, the I/O bridge 17 must wait until after the cache memory 13-2 writes back the data to the main memory 18. Then, the I/O bridge 17 can successfully re-issue its ownership claiming command to claim ownership in the data, e.g., read the data from the main memory 18. This process is disadvantageous because many cycles are utilized to transfer ownership of the data line to the I/O bridge 17. Furthermore, the system bus 16 is utilized twice; once to transfer the modified data from the cache memory 13-2 to the main memory 18 and once to transfer the same data from the main memory 18 to the I/O bridge 17.

FIG. 3 illustrates an alternative transfer scheme called "memory reflection." As before, the I/O bridge 17 issues its ownership claim command on cycle one. Likewise, the cache memory 13-2 responds on cycle four to indicate that it already owns a modified copy of the data line in which the I/O bridge 17 has attempted to claim ownership.

Furthermore, the cache memory 13-2 issues a write command on cycle six and writes back the modified cache line to the main memory 18 on cycles seven to ten. This is possible because the I/O bridge 17 does not re-issue its command for claiming ownership in the cache line on cycle six. Rather, the I/O bridge 17 enters a tracking mode in which the I/O bridge 17 monitors the command bus of the system bus 16 for the write command issued by the cache memory 13-2. Thus, on cycle six, the I/O bridge 18 can detect the cache memory's 13-2 command and address for writing back the data line in which the I/O bridge 17 unsuccessfully claimed ownership. When the cache memory 13-2 transfers the data to the main memory 18 on cycles seven to ten, the I/O device 17 "snarfs" or "eavesdrops" on the data intended for the main memory 18 on cycles seven to ten from the data bus of system bus 16. Thus, the I/O bridge 17 receives the data at the same time as the main memory 18. This obviates the need for the I/O bridge 17 to issue a subsequent read command to the main memory 18, resulting in substantial savings of time.

Stated more generally, the memory reflection scheme is utilized by a "write back agent", a "memory subsystem agent" and one or more "snarf agents." A "write back agent" is a device, such as the cache memory 13-2, which writes back a modified data line. A "memory subsystem agent" is a device, such as the main memory 18, in which the integrity of the data must be maintained. A "snarfing agent" is a device, such as the I/O bridge 17, which attempts to claim ownership in the data line. When the write back agent writes back the data line to the memory subsystem agent, the snarfing agent snarfs the data. The memory reflection scheme requires approximately one-half the time of the first alternative process. Moreover, the memory reflection scheme utilizes only one data transfer on the system bus 16 to transfer data to two destinations contemporaneously.

The devices 12-1 to 12-n, 13-1 to 13-n, 14, 15, 17 and 18 of computer system 10 are divided into two groups: masters and slaves. Devices which issue commands are called masters. Devices which respond to commands are called slaves. Typically, programmable devices such as processors or CPUs are masters. Cache memories, because they issue read and write commands to the main memory, are also classified as masters. An I/O bridge, because it too can issue read and write commands to the main memory, can be classified as a master. Other examples of masters are SCSI interfaces and hard disk controllers. The main memory 18 is typically classified as a slave device because it responds to the read and write commands issued by the master devices 12, 13, and 17. Other examples of slave devices are I/O devices such as printers, monitors and hard disk drives. In general, data is exchanged between the masters and slaves in response to the commands issued by the masters. For example, the master devices generate write commands for writing particular data into, and read commands for reading out particular data from, particular slave devices. There may be a plurality of both master devices and slave devices in the computer system 10.

As noted above, the CPUs 12-1 to 12-n can operate at a clock speed of up to 133 MHz. The system bus 16 typically operates at a clock speed of 33 MHz. The main memory 18, on the other hand, often operates at a clock speed of approximately 16.7 MHz. Because the main memory 18 is several times slower than the CPUs 12-1 to 12-n, the CPUs 12-1 to 12-n remain idle for many clock cycles while waiting for the main memory 18 to process a previously received commands.

As noted above, the clock speeds of the masters far exceed the clock speed of the main memory 18 (e.g., 16.7 MHz). It is possible that several masters can issue data access commands in succession before the main memory 18 satisfies the first command. To accommodate such a scenario, and to further increase efficient use of the main memory 18, a memory controller 19 is employed as an intermediary between the main memory 18 and the system bus 16. As shown in FIG. 4, the memory controller 19 contains a set of three buffers: the command buffer 20, the write buffer 22, and the read buffer 23. The command buffer 20 typically has four command buffer slots 21-1 to 21-4. Each command buffer slot 21 contains either a read or write command that was issued by one of the masters, e.g., 12-1 to 12-n, 13-1 to 13-n, 17, etc. In addition, the command buffer slot 21 also contains a memory address indicating where the data is to be read from or written to. The data associated with a write command can be temporarily stored in a write buffer 22 before being written to the main memory 18. The read buffer 23, on the other hand, is for buffering the data transferred from the main memory 18 to the system bus 16.

FIG. 4 shows three write commands (W1, W2, and W3) being stored in the command buffer 20, and their corresponding data stored in the write buffer 22 (indicated as shaded slots). In the case depicted in FIG. 4, a read command, R, e.g., issued by CPU 12-1, has entered the command buffer 20 after three previously issued write commands W1, W2 and W3. In FIG. 4, the memory controller 19 uses a simple "first-in first-out" (FIFO) or "strictly in-order" scheme to process read and write commands R, W1, W2 and W3. As the name implies, the read and write commands R, W1, W2, W3 are handled in the order in which they are received by the memory controller 19. Unfortunately, in this example, the CPU 12-1 that issued the read command R cannot be immediately updated because the read command is "blocked", i.e., delayed, by the previous three write commands W1, W2 and W3.

The blocking of read commands causes a negative impact on CPU utilization. Under normal conditions, after a CPU e.g., the CPU 12-1, issues a write command and sends the data to the memory controller 19, the CPU 12-1 can continue processing subsequent jobs. However, due to data dependencies after a read command is issued, the issuing CPU 12-1 may have to remain idle until the requested data is returned from the main memory 18. Consequently, the response time of read operations is much more important to the overall performance of the computer system 10 than the response time of write operations. In the case depicted in FIG. 4, the response time for the read statement is four times longer than the actual memory read time (assuming that read and write operations require the same memory access time). This problem is exacerbated when multiple CPUs share the main memory 18. In particular, consider that the multiple processors 12-1 to 12-n may be simultaneously executing program instructions. With multiple processors executing program instructions, the number of read and write commands issued to the memory controller 19 will increase linearly. Hence the average number of operations queued in the command buffer 20 may grow accordingly. The result is that a newly arriving read command must wait in the memory controller command buffer 20 for a longer period of time.

There have been a variety of schemes to reduce the "memory read response time" (MRRT) of the main memory 18. U.S. Pat. No. 5,333,276 teaches an I/O bridge which decreases the memory response time for read and write commands that cross both the system bus 16 and I/O expansion bus 16' (i.e., read and write commands issued by an I/O device 14 to the main memory 18 or from a CPU 12-1 to 12-n to an I/O device 14.). In particular, this reference teaches a computer system with a single master, namely, the CPU or processor. The master performs read and write operations on multiple slaves (e.g., I/O modules, main memory, etc.) The technique taught in this reference is not well suited to computer systems with multiple masters, especially those that utilize snarfing. Furthermore, when multiple slaves are present, the technique taught in this reference requires a large and very complex state diagram which is difficult to implement.

Another prior art method for reducing MRRT is, the "read-around-write" scheme. Under the read-around-write scheme, a read command has a higher priority in the command buffer 20 and can bypass previous write commands. The read-around-write scheme is shown in FIG. 5. FIG. 5 shows that, although a read command R enters the buffer later than three previously received write commands, W1, W2, and W3, the read command can bypass (dashed line) the write commands W1, W2, and W3 and be the first command executed. The MRRT in the read-around-write case in FIG. 5 is the same as the true memory access time that a read command requires.

Although the read-around-write scheme works well in the previously mentioned scenario, there are other scenarios where this scheme does not yield the minimum MRRT. Such a scenario is shown in FIG. 6, where a read command R follows three write W1, W2 and W3 commands. In this case, the read command R accesses the same addressed memory location as one of the write commands W2. As such, the read command R advances in execution priority before the write command W3 (dashed line). However, the execution of the read command R is delayed until the write command W2 is executed, in order to ensure data consistency. Consequently, the execution of the W2 command would occur only after the execution of the W1 command and, apparently, the execution of the read command R would be delayed until the execution of the W2 command. In this case, the MRRT is three times longer than the true memory access time that a read command requires.

It is, therefor, an object of the present invention to present a memory controller scheme with improved MRRT.

SUMMARY OF THE INVENTION

These and other objects are achieved by the present invention. According to one embodiment, a method is provided for reading out data from, and writing data into, a memory in an environment where one or more masters transfer read and write commands to a memory controller. The memory controller, in turn, sequences the reading and writing operations requested by the received commands. The memory controller receives a first command to write a first data at a first address of a memory. The memory controller stores the first data in a data buffer after it is received but before the first data is written into the main memory. Then, the memory controller receives a read command to read out the data stored in the same first address at which the previously received, pending write command is to store its first data. In response, the memory controller transfers a copy of the first data from the first buffer to the master which issued the read command. Illustratively, the memory controller also (contemporaneously) writes a copy of the first data at the first address of the main memory. The "combination" of the read and write command is illustratively performed before each other command. Advantageously, the execution of the read and write commands is initiated simultaneously.

Stated another way, the memory controller combines a read command with a previously received write command to the same address as the read command and executes the combined read-write command before any other previously received, pending command. Note that by combining the read command with the write command, the reading of the data (in response to the read command) may be executed immediately, i.e., before any other previously received, pending commands.

Illustratively, the memory controller has at least one buffer for storing the data of the commands and selection logic for causing a read command to be combined with a previously received, pending write command. Illustratively, comparison circuitry compares the type (i.e., read or write) and the address of each newly received command with the type and address of each other previously received, pending command. If the newly received command is a read command and one of the previously received commands is a write command to the same address as the newly received read command, the selection logic combines the two commands and immediately places the combined command in an execution buffer of the memory controller. From the execution buffer, the data is written into the main memory at the address specified in the write command. Simultaneously, the selection logic causes a copy of the data to be transferred to a read data buffer of the memory controller from which the data is transferred to the master which issued the read command.

The selection logic may perform other command modifications. For instance, suppose the selection logic determines that a newly received command is a write command to the same address as any other previously received, pending write command. The selection logic, illustratively aborts the previously received, pending write command. The selection logic can also perform the read-around-write operation, in which the selection logic causes a newly received read command to be executed before each other previously received, pending write command (having different addresses than the newly received read command).

The read and write method disclosed above accords with the data ownership protocol commonly utilized in computer systems. For instance, a first device requesting ownership in a data line does so by issuing a first read or a write command. If a second device currently owns that data line, the second device will issue an intervention command and will write back the modified copy of the data by issuing a second write command. In this scenario, the memory controller will receive the first command (unsuccessful ownership claim by the first device) and later receive the second command (write back of modified data by the second device). Thus, according to the invention, the memory controller aborts the first command. Typically, in response to the intervention command, the first device will issue a third command for reading out the modified data written back by the second device. In response, the memory controller combines this third command with the second command so as to speed up MRRT.

In short, a method and apparatus are disclosed for speeding up MRRT. By enabling the combination of read and write commands, the invention always ensures that write commands do not block time sensitive read commands. The invention particularly accords with the ownership claiming protocol utilized in computer systems.

DETAILED DESCRIPTION OF THE INVENTION

Figure 1:
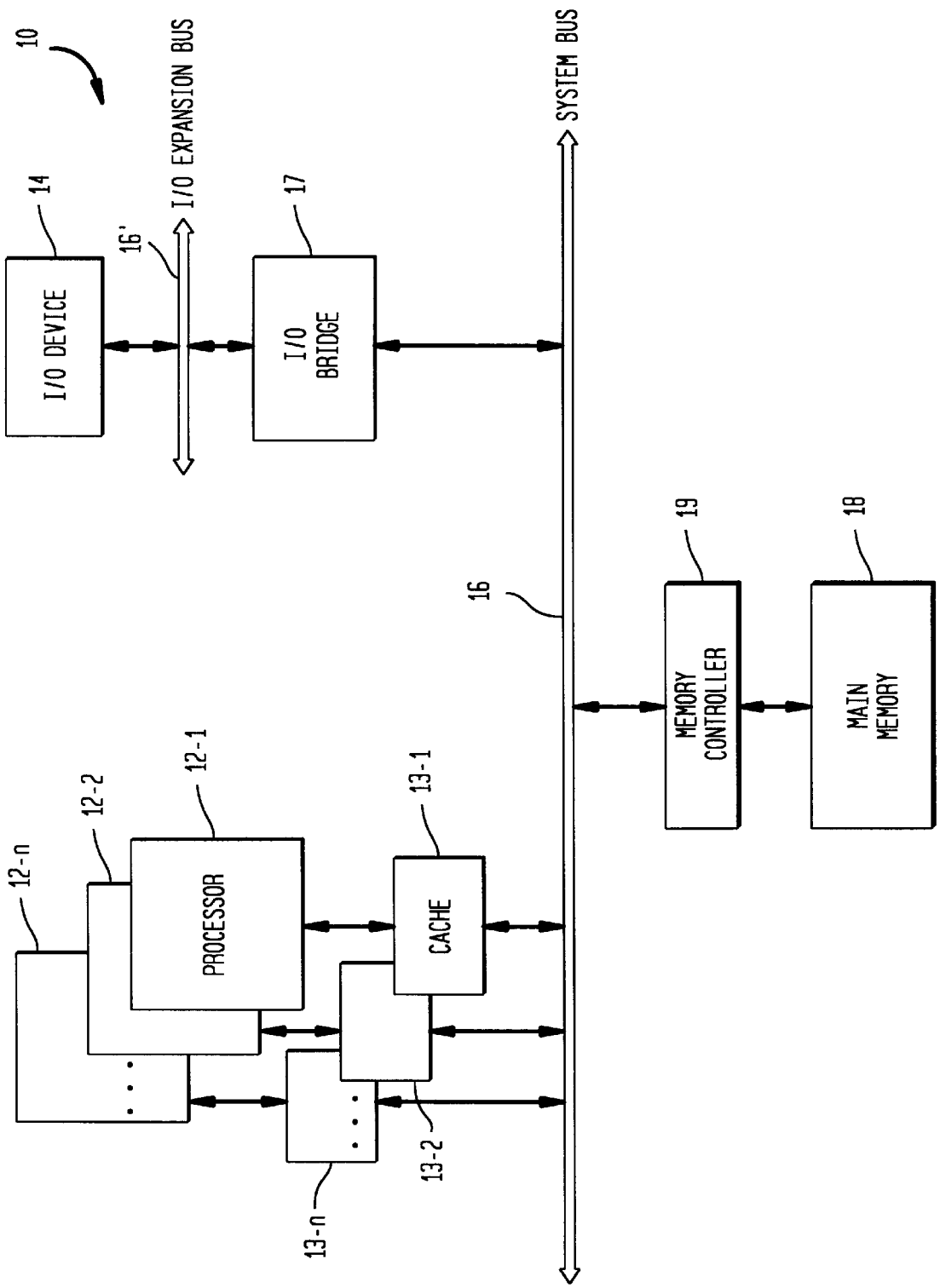
FIG. 1 shows a prior art computer system.
Figure 2:
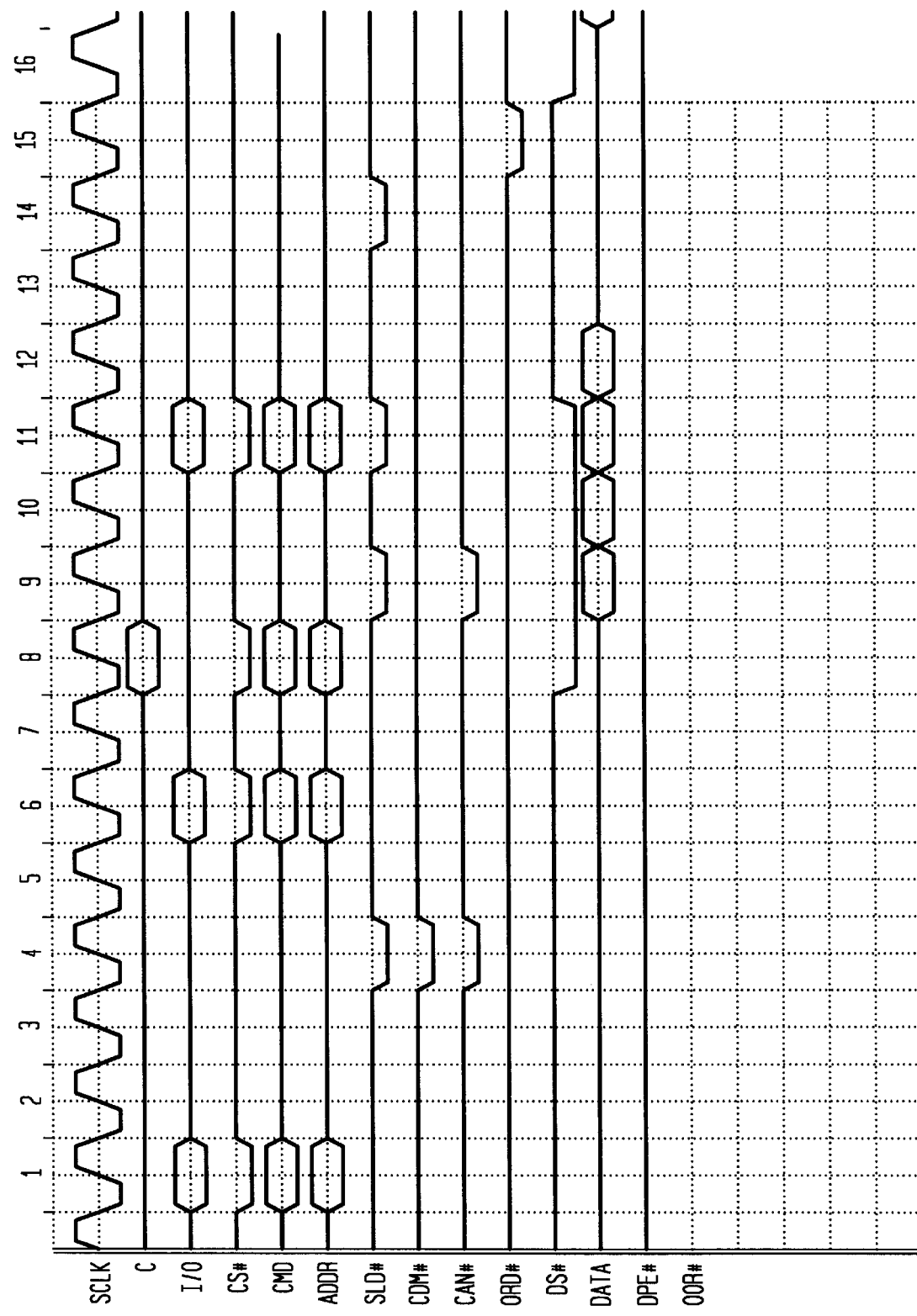
FIG. 2 is a timing diagram illustrating an ownership claim-write back scheme utilizing at least two transfers of data.
Figure 3:
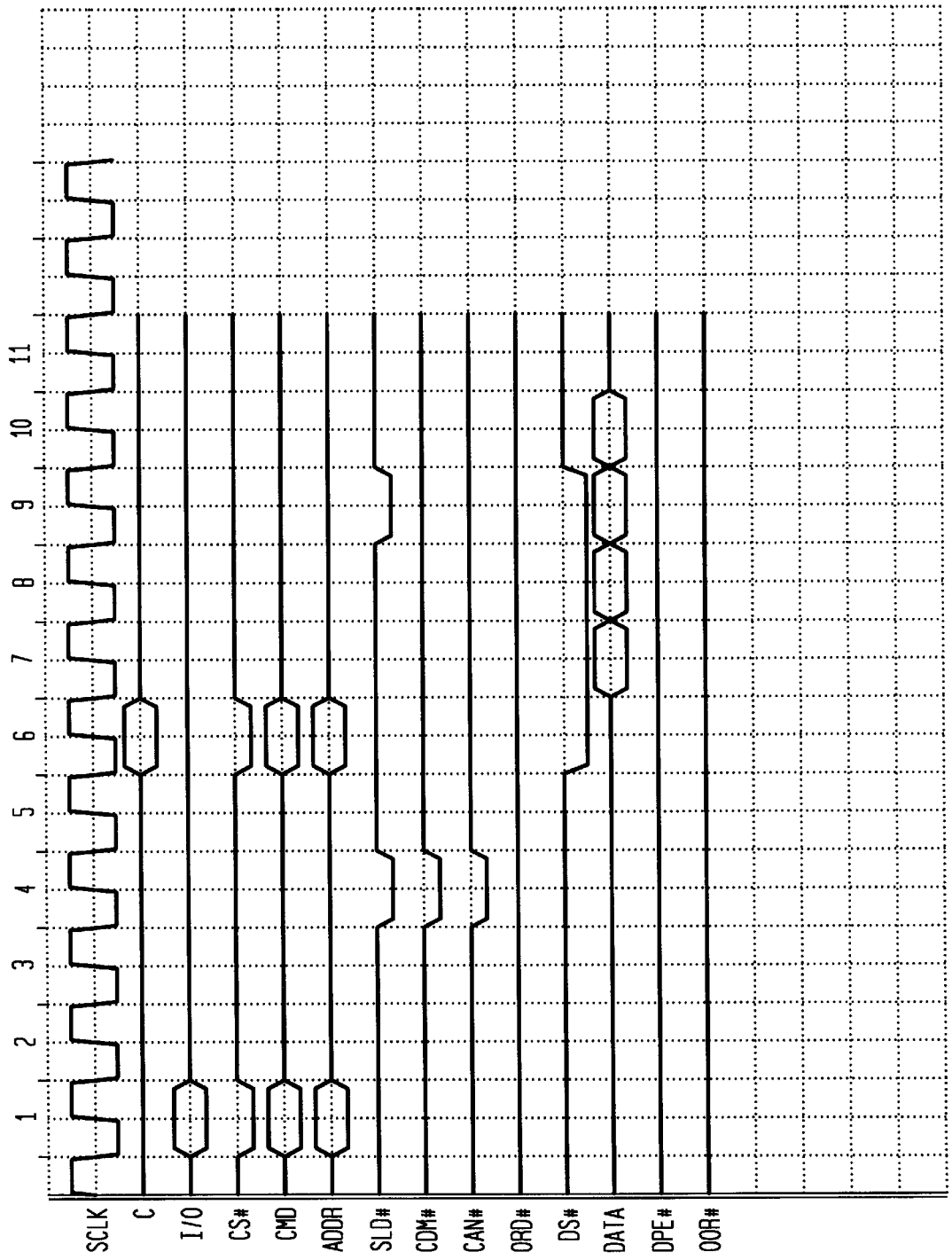
FIG. 3 shows a timing diagram illustrating a conventional memory reflection scheme.
Figure 4:
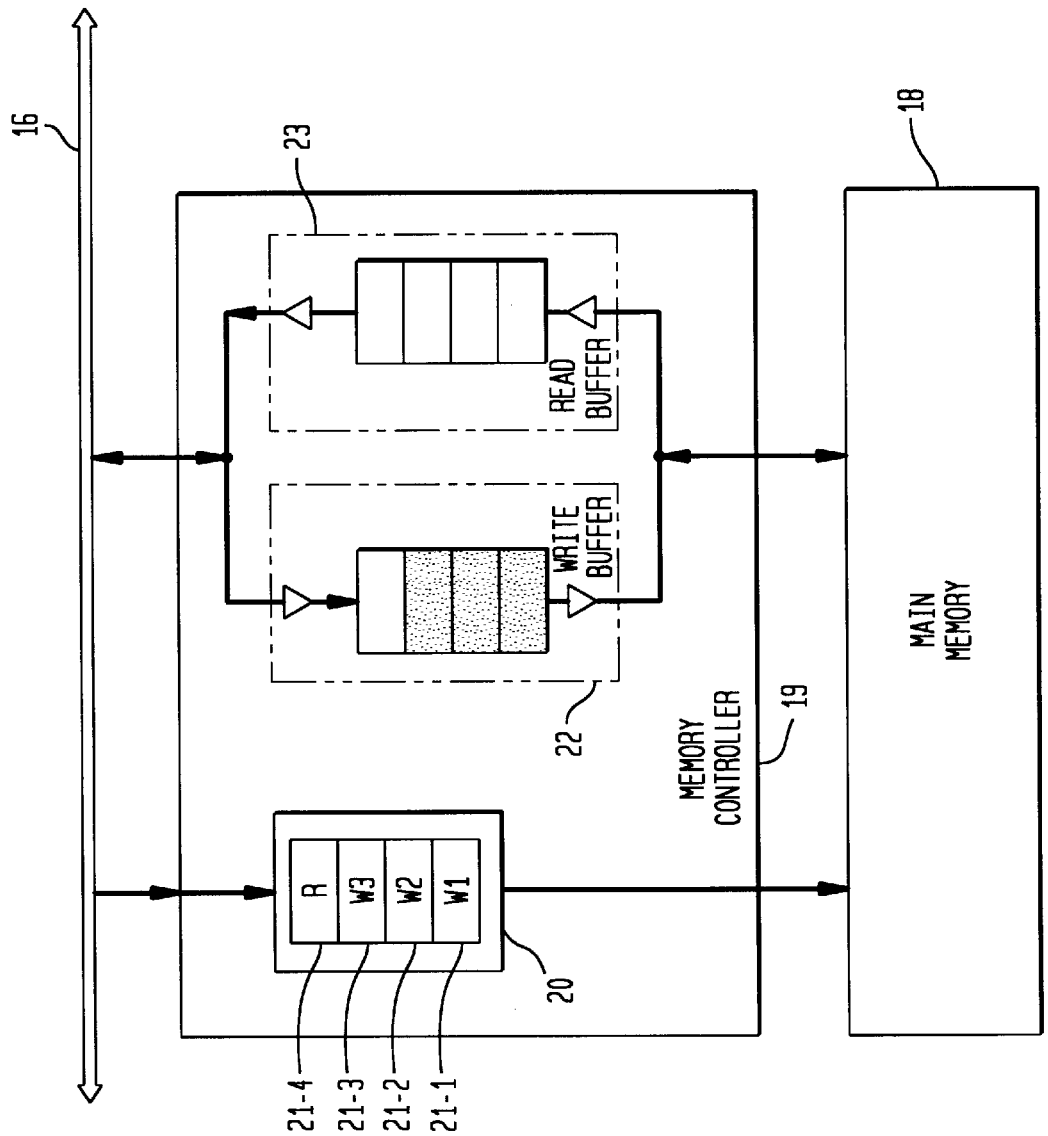
FIG. 4 shows a prior art memory controller.
Figure 5:
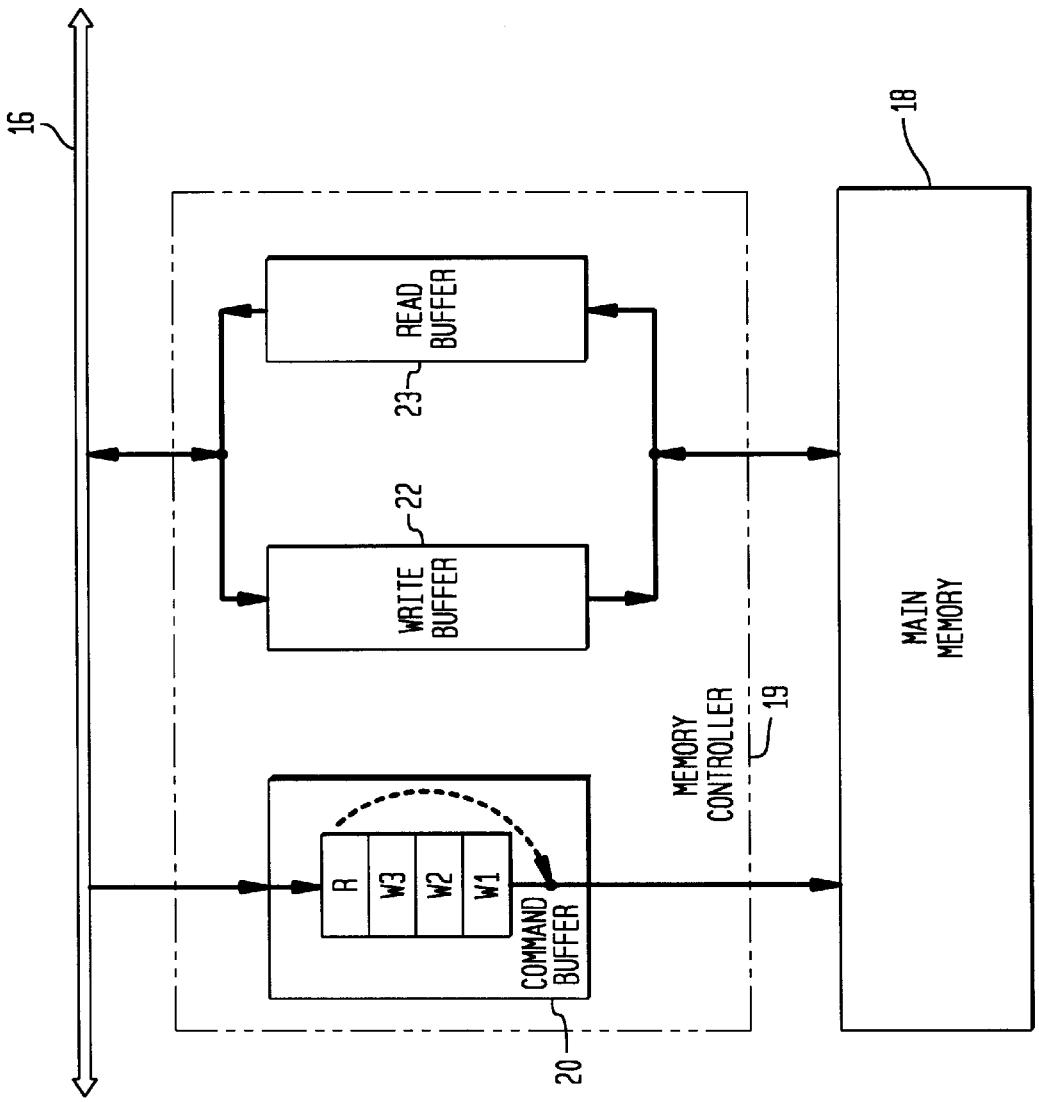
FIG. 5 shows a prior art memory controller with a read-around-write scheme.
Figure 6:
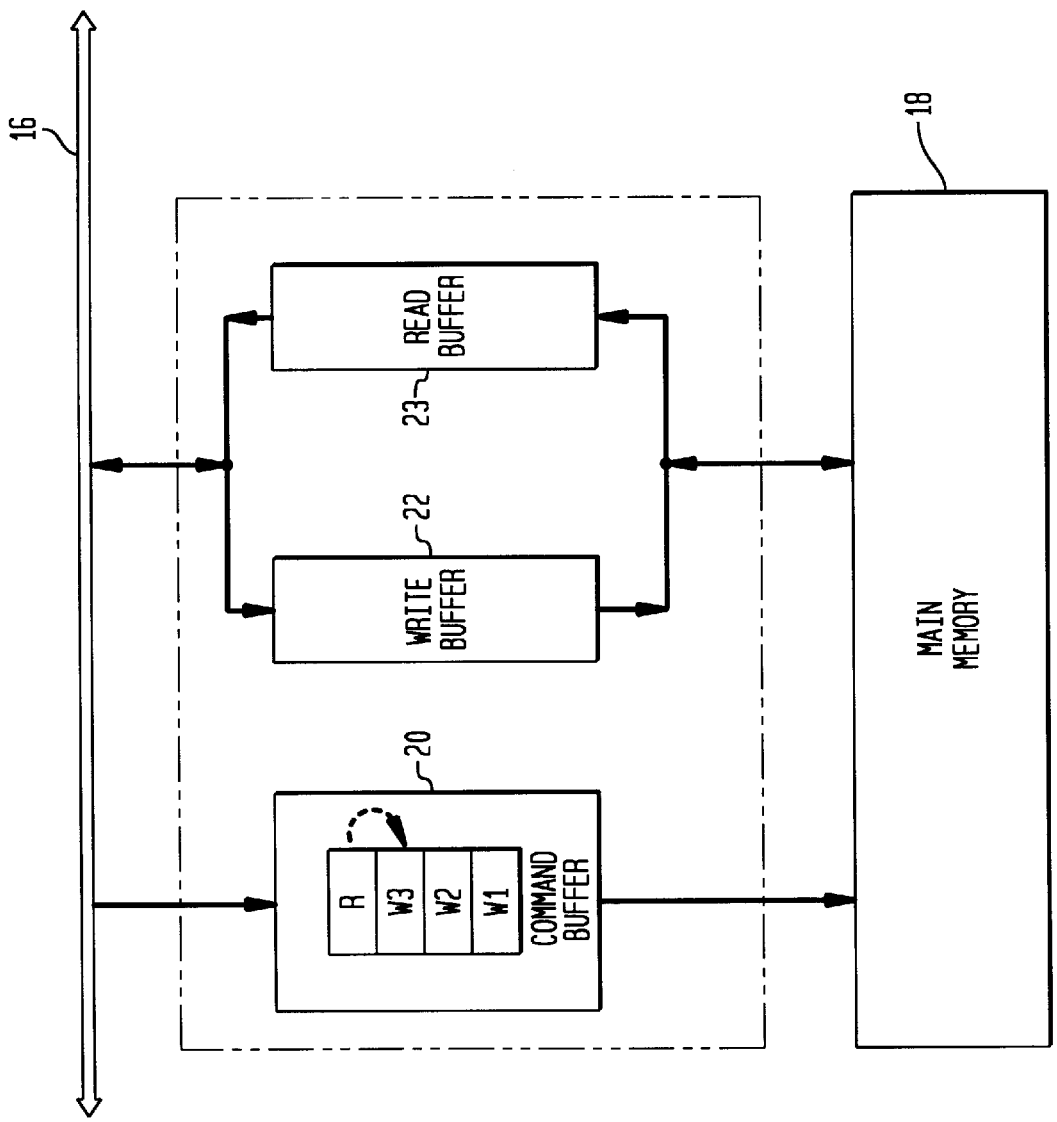
FIG. 6 shows a prior art memory controller with a read-around-write scheme.
Figure 7:
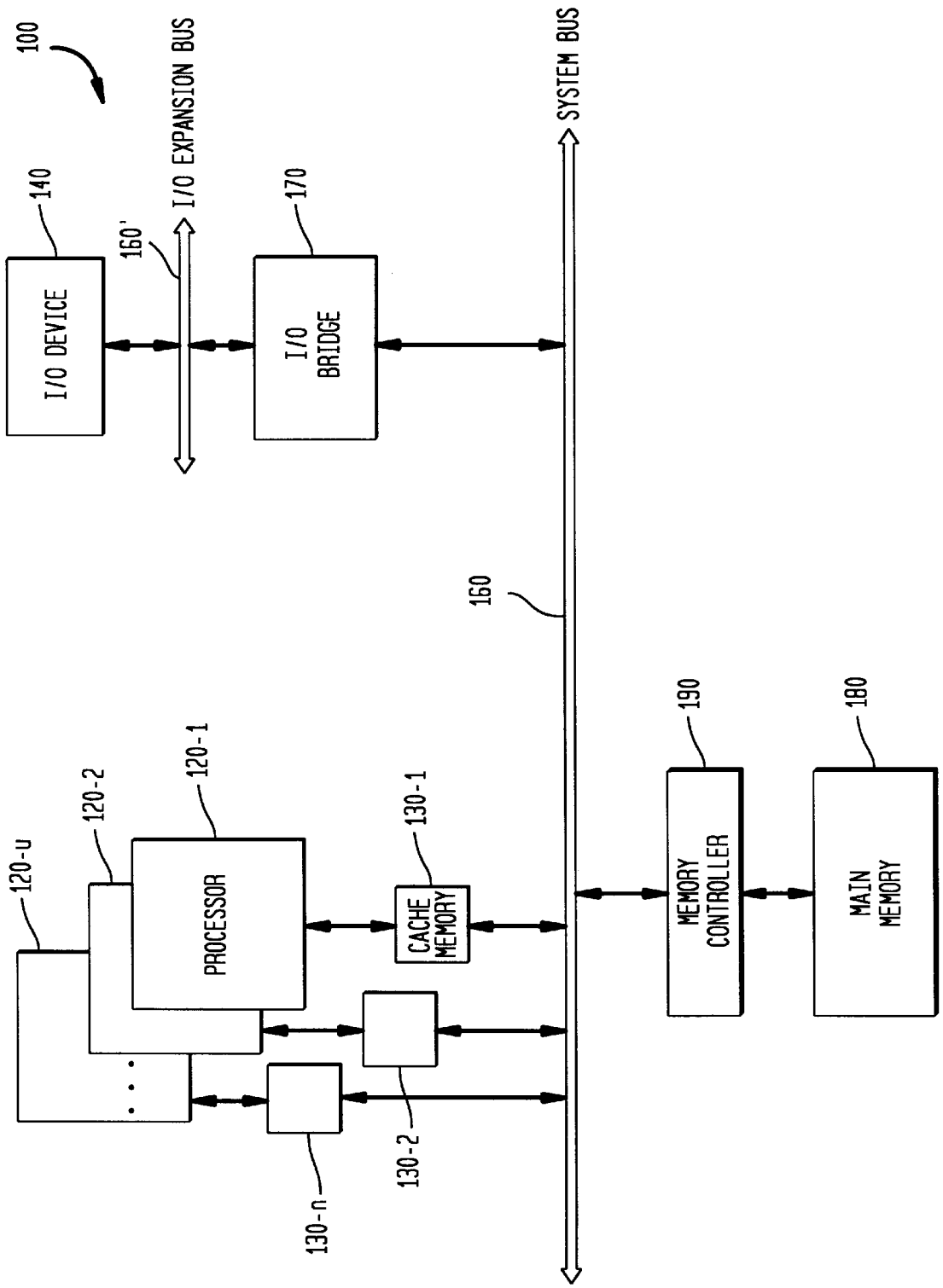
FIG. 7 shows a computer system according to the present invention.

Referring to FIG. 7, a computer system 100 according to one embodiment of the present invention is shown. Like the conventional computer system 10 shown in FIG. 1, the computer system 100 shown in FIG. 7 has a plurality of processors or CPU's 120-1, 120-2 to 120-n. Each CPU 120-1 to 120-n has a corresponding cache memory 130-1, 130-2 to 130-n. A shared main memory 180 is connected to a memory controller 190 which in turn is connected to the system bus 160. An I/O bridge 170, I/O expansion bus 160' and I/O device 140 illustratively are also provided.

Read commands are transmitted on the system bus 160 by masters, e.g., cache memory 130-1, during read cycles. The read cycles include a device indicator within the signal CMD (which specifies the device which is to perform the read command), a read command within the signal CMD (which indicates that data is to be read from, instead of written to, a designated slave device), and an address within the signal ADDR indicating the memory location at which the requested data is located within the specified device. Likewise, write commands are transmitted on the system bus 160 by masters, e.g., the I/O bridge 170, during write cycles. Write cycles include a device indicator within the signal CMD (which specifies the device which is to perform the write operation), a write command within the signal CMD (which indicates that data is to be written to, instead of read from, the designated slave device), the data to be written within the signal DATA, and an address within the signal ADDR indicating where the data is to be written.

Figure 8:
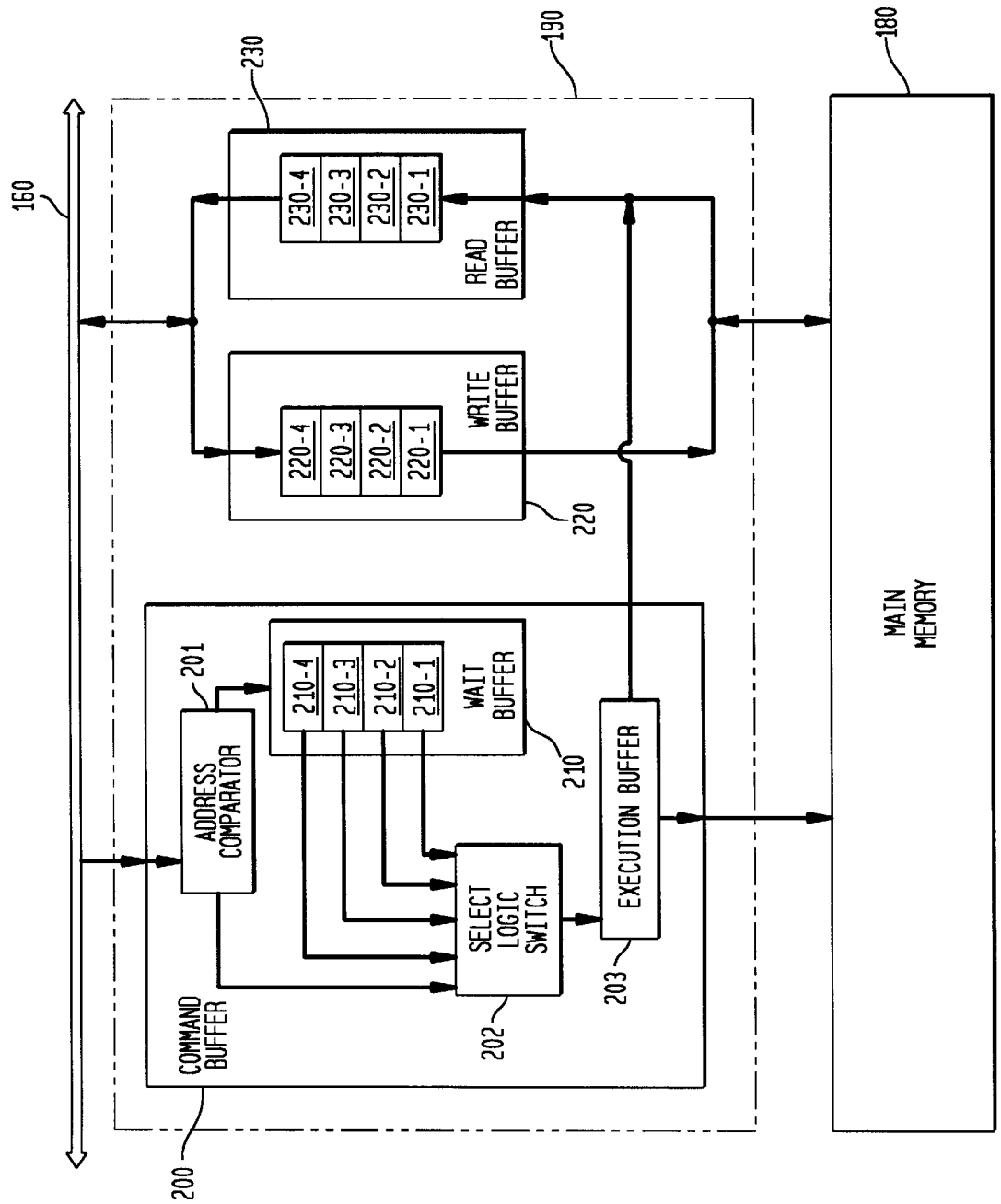
FIG. 8 shows one embodiment of the memory controller according to the present invention.

As shown in FIG. 8, the memory controller 190 has a command buffer 200, a write buffer 220 and a read buffer 230. Within the command buffer 200, there is an address comparator 201, a select logic switch 202, an execution buffer 203 and a wait buffer 210. The wait buffer 210 contains a series of, for example, four wait buffer slots 210-1, 210-2, 210-3, and 210-4. Each of the wait buffer slots 210-1 to 210-4 is for storing a command and a corresponding address. The write buffer 220 has, for example, four write buffer slots, 220-1, 220-2, 220-3, and 220-4. The write buffer slots 220-1, 220-2, 220-3 and 220-4 are for storing data corresponding to the write commands stored in the waiting buffer slots 210-1, 210-2, 210-3, and 210-4 respectively. Read commands in the wait buffer 210, apparently, have no data in the write buffer 220 so the write buffer slots of corresponding read commands remain empty.

The read buffer 230 is used for buffering data read-out of the main memory 180 via the memory controller 190 prior to transfer via the system bus 160. The read buffer 230 has a series of four read buffer slots 230-1, 230-2, 230-3, and 230-4. The read buffer 230 sequentially transmits the data contained in the read buffer slots 230-1 to 230-4 onto the system bus 160 for transfer to the appropriate master which read-out the respective data.

Referring to FIG. 8, when the memory controller 190 receives a read or write command and its corresponding address from the system bus 160, the command and corresponding address are received at the address comparator 201. The address comparator 201 compares the type (i.e., read or write) and the address of the newly received read or write command with the types and addresses of previously received, pending read and write commands in the wait buffer 210. The newly received command and corresponding address are then forwarded to the waiting buffer 210, where the command and corresponding address are placed in the next available waiting buffer slot 210-1, 210-2, 210-3, or 210-4. For example, if there are two previously received, pending commands already in the waiting buffer, these two commands would occupy waiting buffer slots 210-1 and 210-2. The newly received command would then be placed in waiting buffer slot 210-3.

The address comparator 201 forwards indicators of the results of comparing the address and type (i.e., read or write) of the newly received command with the previously received pending commands to the select logic switch 202. Based on the indications of the comparison results, the select logic switch 202 then selects which read or write command to be executed next and sends the command and corresponding address to the execution buffer 203. Once in the execution buffer 203, the command (and data, if the command to be executed next is a write command) is executed immediately (i.e, a read or write is performed) at the memory location specified in the corresponding address. In executing a write operation, the data in the write buffer 220 corresponding to the write command in the execution buffer 203 is transferred to the memory location indicated by the address of the write command in the execution buffer 203. In performing a read operation, the data in the memory location indicated by the address of the read command in the execution buffer 203 is transferred to the read buffer 230. The selection process for the select logic switch 202 is described below.

The address comparator 201 and select logic switch 202 may consist of intelligent digital finite state machines which carry out the functions described below. To illustrate the logic of select logic switch 202, a series of read/write command scenarios will be presented. In all cases, the wait buffer is assumed to have three previously received, pending commands in wait buffer slots 210-1, 210-2, and 210-3. The newly received command will initially occupy wait buffer slot 210-4.

Write Commands—No Address Match

Figure 9:
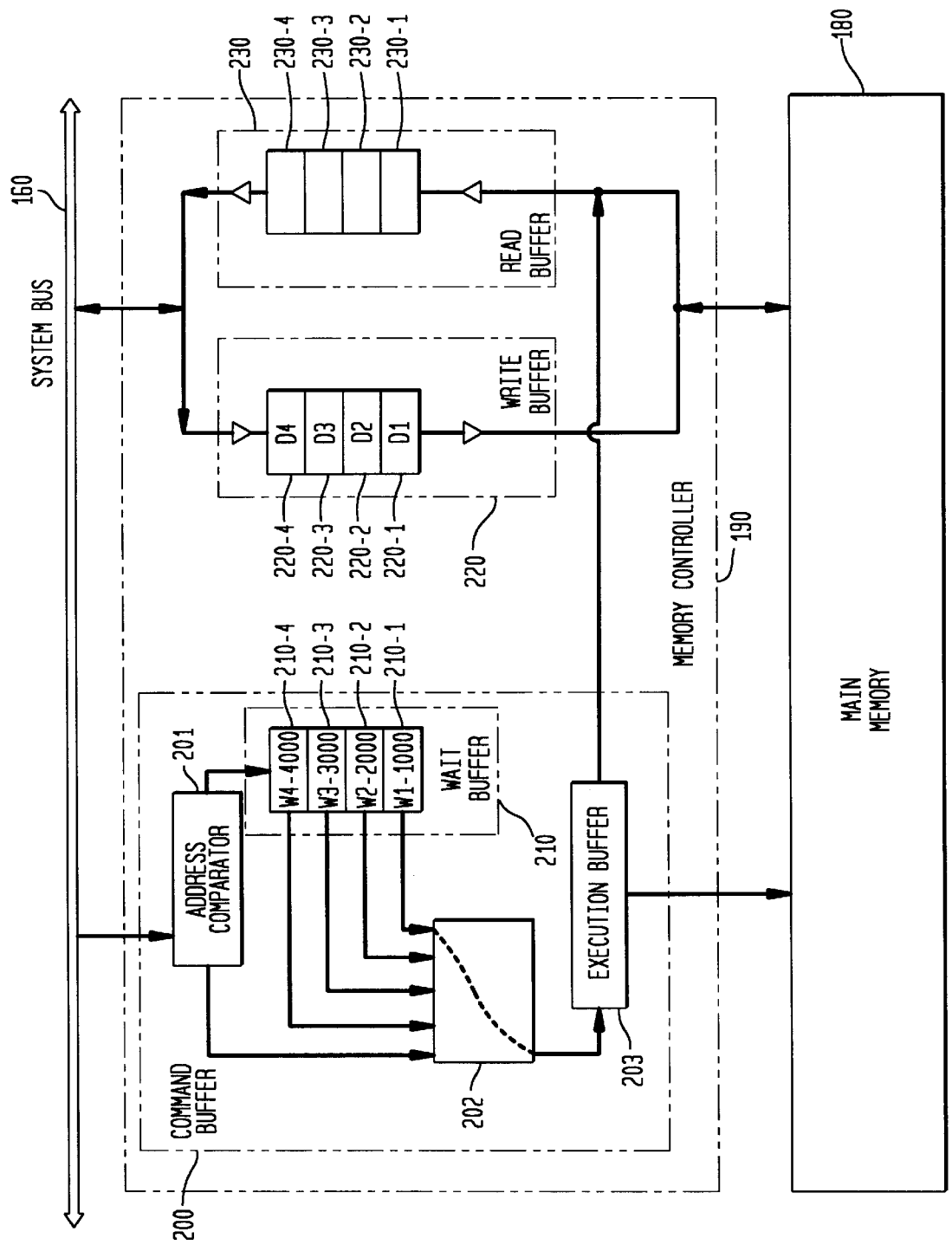
FIG. 9 shows a memory controller switching scenario according to the present invention that involves write statements with dissimilar addresses.

FIG. 9 shows a scenario where the first three commands are all write commands with no matching addresses. In this scenario, the first three previously received, pending commands W1, W2, and W3 in the wait buffer 210 are shown in wait buffer slots 210-1, 210-2, and 210-3 respectively. Data for each write command is stored in the write buffer 220. In this case, write commands W1, W2 and W3 have corresponding data D1, D2 and D3 respectively in write buffer slots 220-1, 220-2 and 220-3. As shown in FIG. 9, the three write commands have dissimilar addresses. Command W1 has address 1000, W2 has address 2000, and W3 has address 3000. A forth write command W4, having address 4000, is input from the system bus 160 into the address comparator 201 and is then placed in wait buffer slot 210-4. Data D4 for write command W4 is placed in the write buffer slot 220-4. The address comparator 201 forwards indicators of the results of comparing the types and addresses of each command in the wait buffer 210 with the newly received command W4 to select logic switch 202. The select logic switch 202, having been informed of the results of comparing the various addresses and types (i.e., read or write) of the commands, detects that none of the commands are read commands and that none of the commands have matching addresses. As such, the select logic switch 202 sends the write command W1 and address in wait buffer slot 210-1 to the execution buffer 203 (dashed line). This causes the corresponding data D1 in write buffer 220-1 to be written into main memory 180. When the wait buffer 210 has all write commands with dissimilar addresses, the logic used by the select logic switch 202 is simply first-in, first-out (FIFO) which is also know as the strictly-in-order sequence.

Write Commands—Address Match

Figure 10:
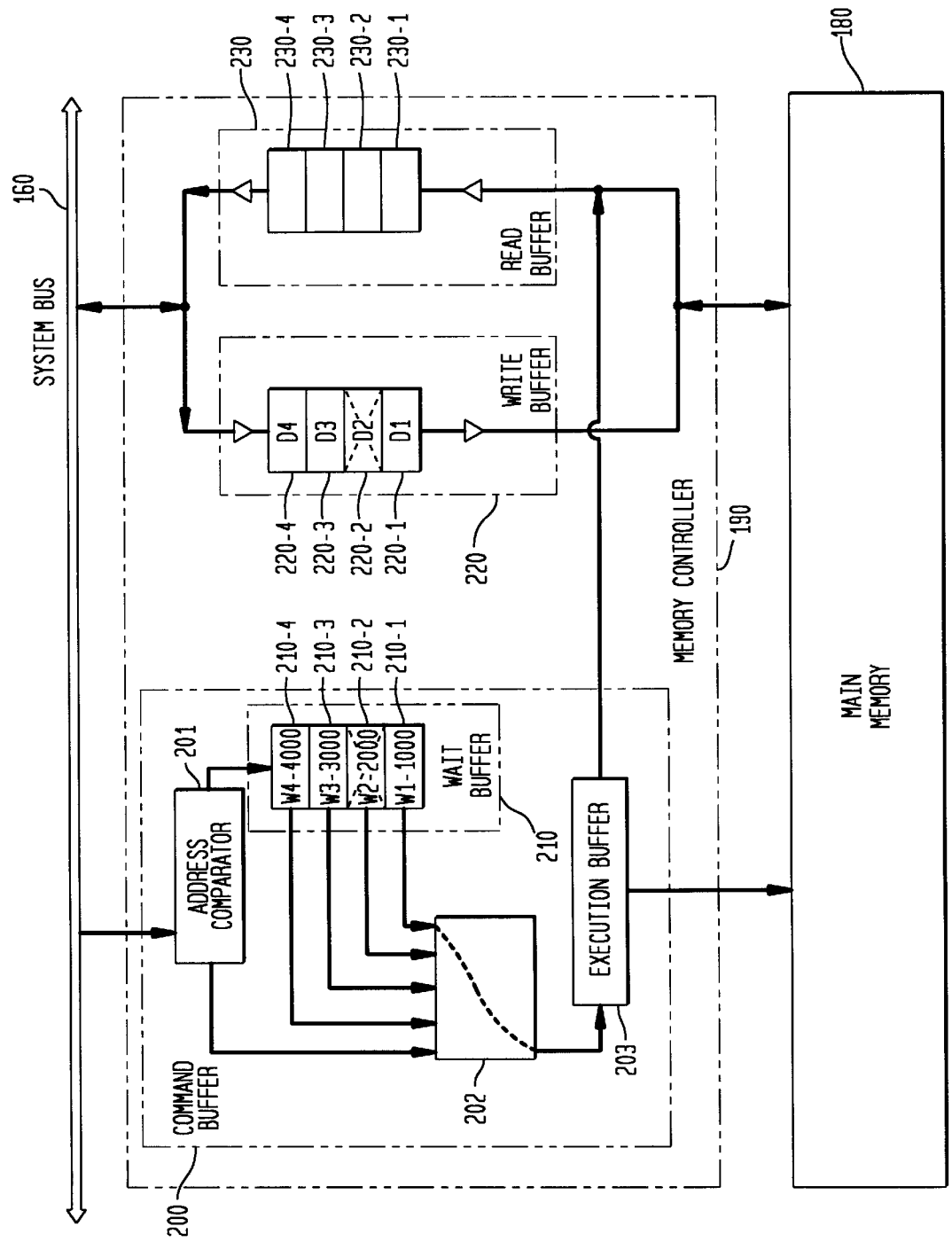
FIG. 10 shows a memory controller switching scenario according to the present invention that involves write statements with a matching set of addresses.

FIG. 10 shows a scenario where the first three commands W1, W2 and W3 are all write commands with no matching addresses. A fourth command W4 is then received which has the same address as a previously received, pending address W2. This can occur if two processor masters, e.g., the processors 120-1 and 120-2, are executing different portions of the same program. The scenario can also occur if a single master issues multiple write commands to the same address.

In this scenario, the first three commands W1, W2, and W3 in the wait buffer 210 are shown in wait buffer slots 210-1, 210-2, and 210-3 respectively, with corresponding data D1, D2 and D3, respectively, in slots 220-1, 220-2 and 220-3 of the write buffer 220. As shown in FIG. 10, the three write commands W1, W2, and W3 have dissimilar addresses. Command W1 has address 1000, W2 has address 2000, and W3 has address 3000. A forth write command W4, having address 2000, is received from the system bus 160 into the address comparator 201 and is then placed in wait buffer slot 210-4. The address comparator 201, forwards indicators of the results of comparing the types and addresses of each command in the wait buffer 210 with the newly received command W4 to select logic switch 202. The select logic switch 202, having been informed of the results of comparing the various command types and addresses of the commands, detects that two of the addresses corresponding to commands W2 and W4 match and that these two commands are write commands. Because write command W4 was received after write command W2, write command W4 is presumed to have updated information and write command W2 is aborted (dashed "X" in FIG. 8). Because all of the commands in the waiting buffer are write commands, all are treated equally. Consequently, the select logic switch 202 sends the write command W1, having been placed into the memory controller first, into the execution buffer 203 (dashed line) causing the corresponding data D1 in write buffer 220-1 to be sent to main memory 180. Thereafter, command W3 is executed, followed by command W4.

Read and Write Commands, Read-Around-Write Mechanism

Figure 11:
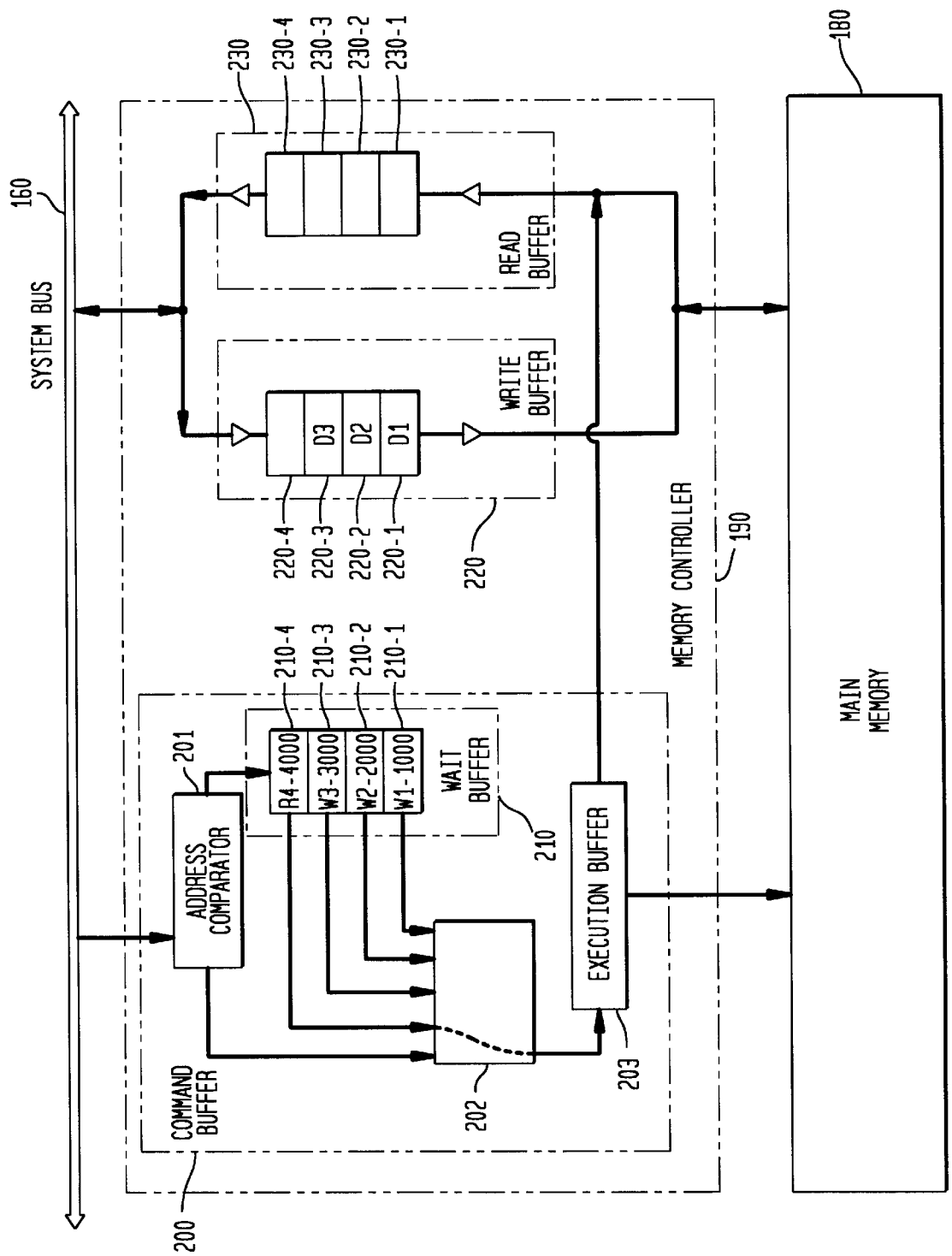
FIG. 11 shows a memory controller switching scenario according to the present invention that involves a read statement and previous write statements.

FIG. 11 shows a scenario where a read command R4 is received after three write commands W1, W2 and W3. The addresses of all of the write commands W1, W2 and W3 are unique, i.e., no matching addresses. Advantageously, in order to maximize utilization of the high-speed processors, the read command R4 is given priority over the write commands W1, W2 and W3.

In this scenario, the first three commands W1, W2 and W3 in the wait buffer 210 are shown in wait buffer slots 210-1, 210-2, and 210-3 respectively, with corresponding data D1, D2 and D3 in the write buffer slots 220-1, 220-2 and 220-3 respectively. As shown in FIG. 11, the three write commands W1, W2 and W3 have dissimilar addresses. Command W1 has address 1000, W2 has address 2000, and W3 has address 3000. A read command R4, having address 4000, is received from the system bus 160 into the address comparator 201 and is then placed in wait buffer slot 210-4. The address comparator 201, forwards indicators of the results of comparing the types and addresses of each command in the wait buffer 210 with the newly received command R4 to select logic switch 202. The select logic switch 202, having been informed of the results of comparing the various types and addresses of the commands, detects that none of the addresses match. However, the select logic switch 202 also detects that a later received command R4 is a read type of command which is blocked (delayed) by write commands W1, W2, and W3. Consequently, in this scenario, select logic switch 202 sends (dashed line) the read command R4 and address in wait buffer slot 210-4 to the execution buffer 203 and the read command is executed on the main memory 180 before commands W1, W2 and W3.

Read and Write Commands, Read-From-Write Mechanism

Figure 12:
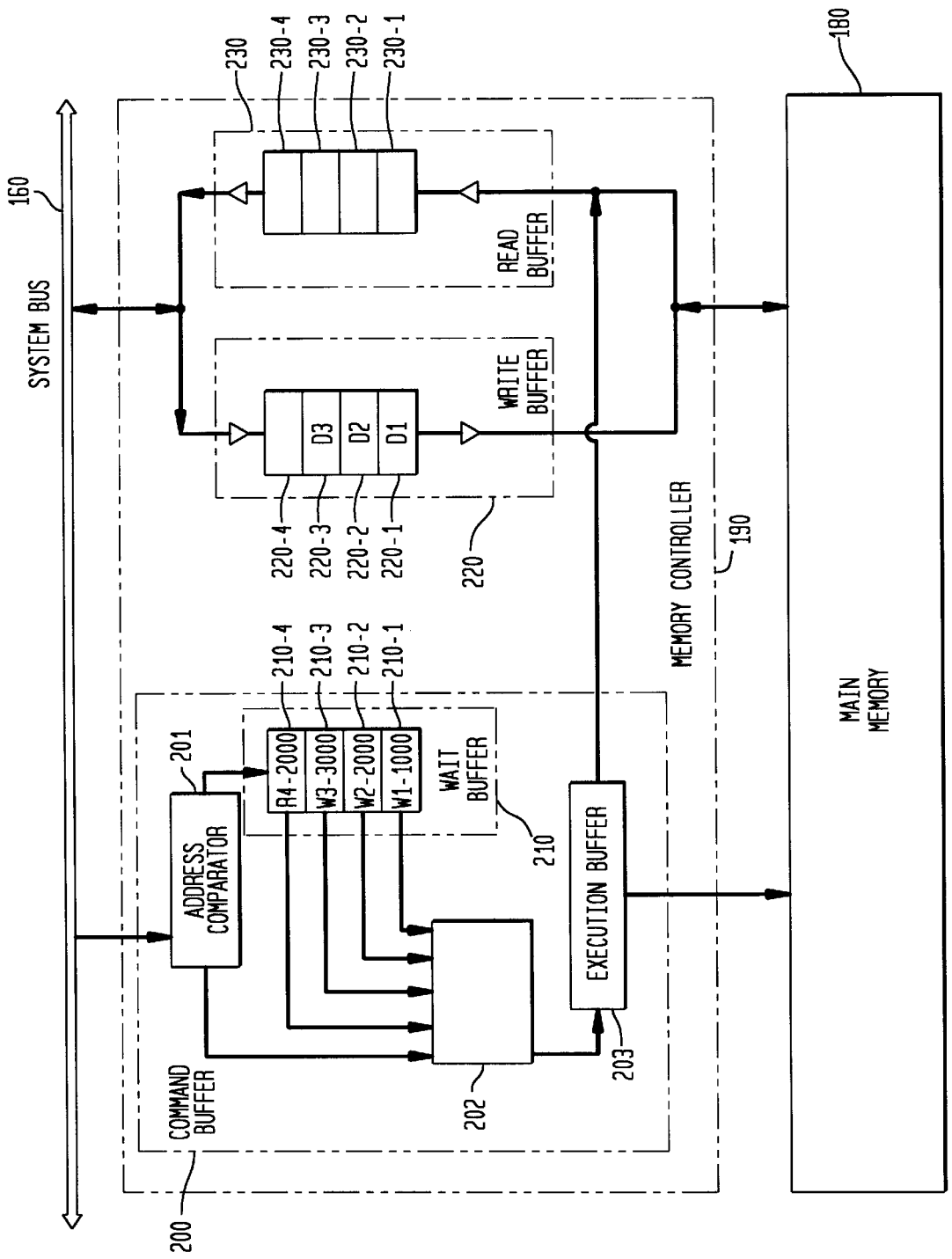
FIG. 12 shows a memory controller switching scenario according to the present invention that involves a read statement and a previous write statement having matching addresses.

FIG. 12 shows a scenario where the first three commands are all write commands W1, W2 and W3 with no matching addresses. A fourth command R4 is then received for reading out data from the same address into which the command W2 is to write data. Again, this can occur if two processor masters are executing different portions of the same program.

Figure 13:
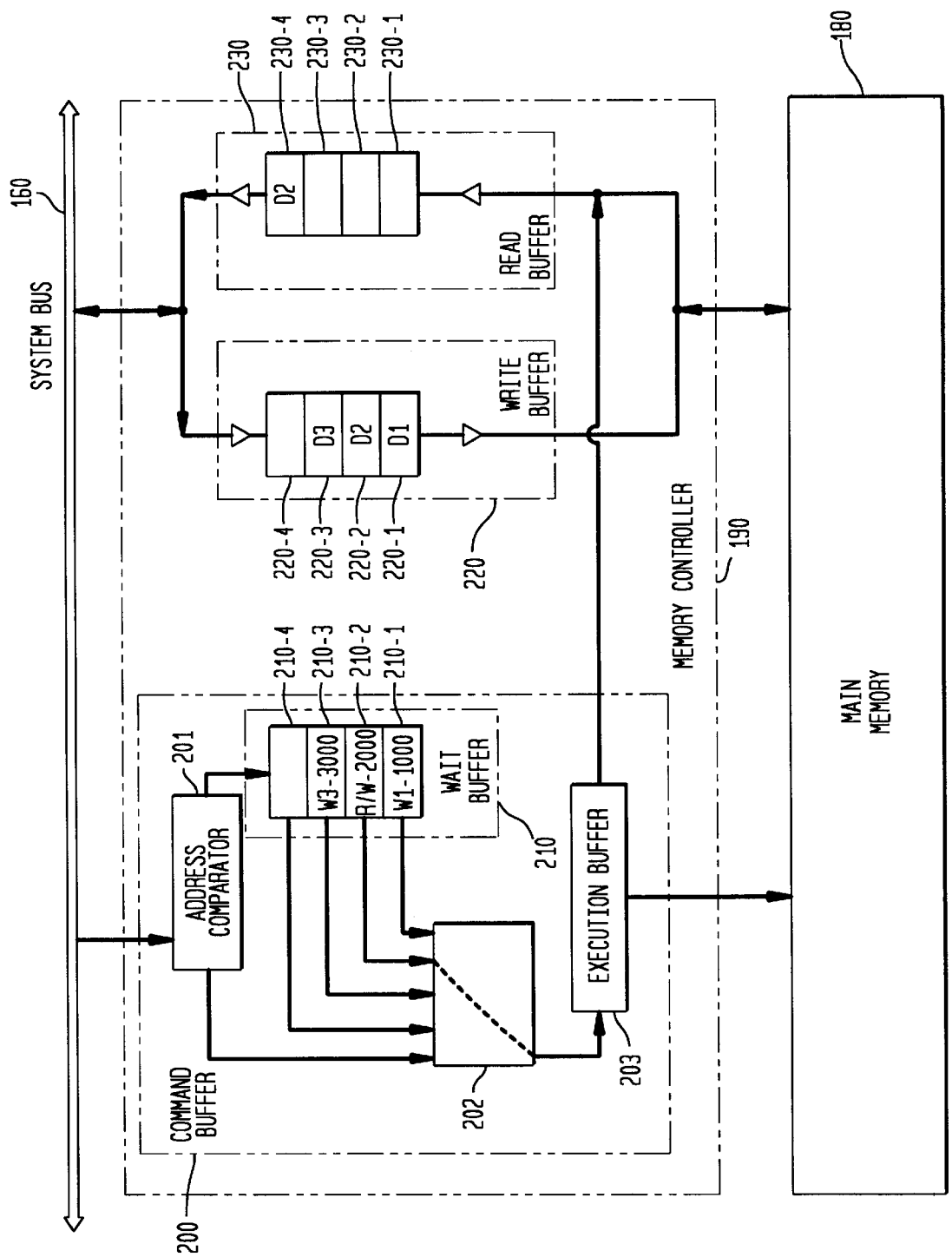
FIG. 13 shows a memory controller switching scenario as in FIG. 12 after the read statement and write statement have been combined.

In this scenario, the first three commands W1, W2, and W3 in the wait buffer 210 are shown in wait buffer slots 210-1, 210-2, and 210-3 respectively, with corresponding data D1, D2 and D3 in write buffer slots 220-1, 220-2 and 220-3 respectively. As shown in FIG. 12, the three write commands W1, W2, and W3 have dissimilar addresses. Command W1 has address 1000, W2 has address 2000, and W3 has address 3000. A read command R4, having address 2000, is input from the system bus 160 into the address comparator 201 and is then placed in wait buffer slot 210-4. The address comparator 201 compares the types and addresses of each command in the wait buffer with the newly received command R4 and sends indications of the results of the comparisons to select logic switch 202. The select logic switch 202, having been informed of the results of comparing the various types and addresses of the commands, detects that the addresses of write command W2 and read command R4 match (wherein the write command W2 was received before the read command R4). In order to maximize utilization of the high-speed processors, read commands are given priority over write commands. Consequently, in this scenario, select logic switch 202 combines read command R4 and write command W2 into read/write command R/W and transfers the combined command R4 in wait buffer slot 210-2 as shown in FIG. 13. The combined read/write command R/W and address is then sent to the execution buffer 203 (dashed line) prior to executing write command W1. Because write command W2 has been modified into a combined read/write command R/W, the execution buffer sends a write command with corresponding data D2 from the write buffer to main memory 180 and, contemporaneously, directs a copy of the data D2 from the write buffer slot 220-2 to the next available read buffer slot 230-4. As such, the read command R4 is executed by transferring a copy of the data D2 in write buffer slot 220-3 directly to the read buffer 230 without first reading out the data D2 from the memory.

Read Commands—No Address Match

Figure 14:
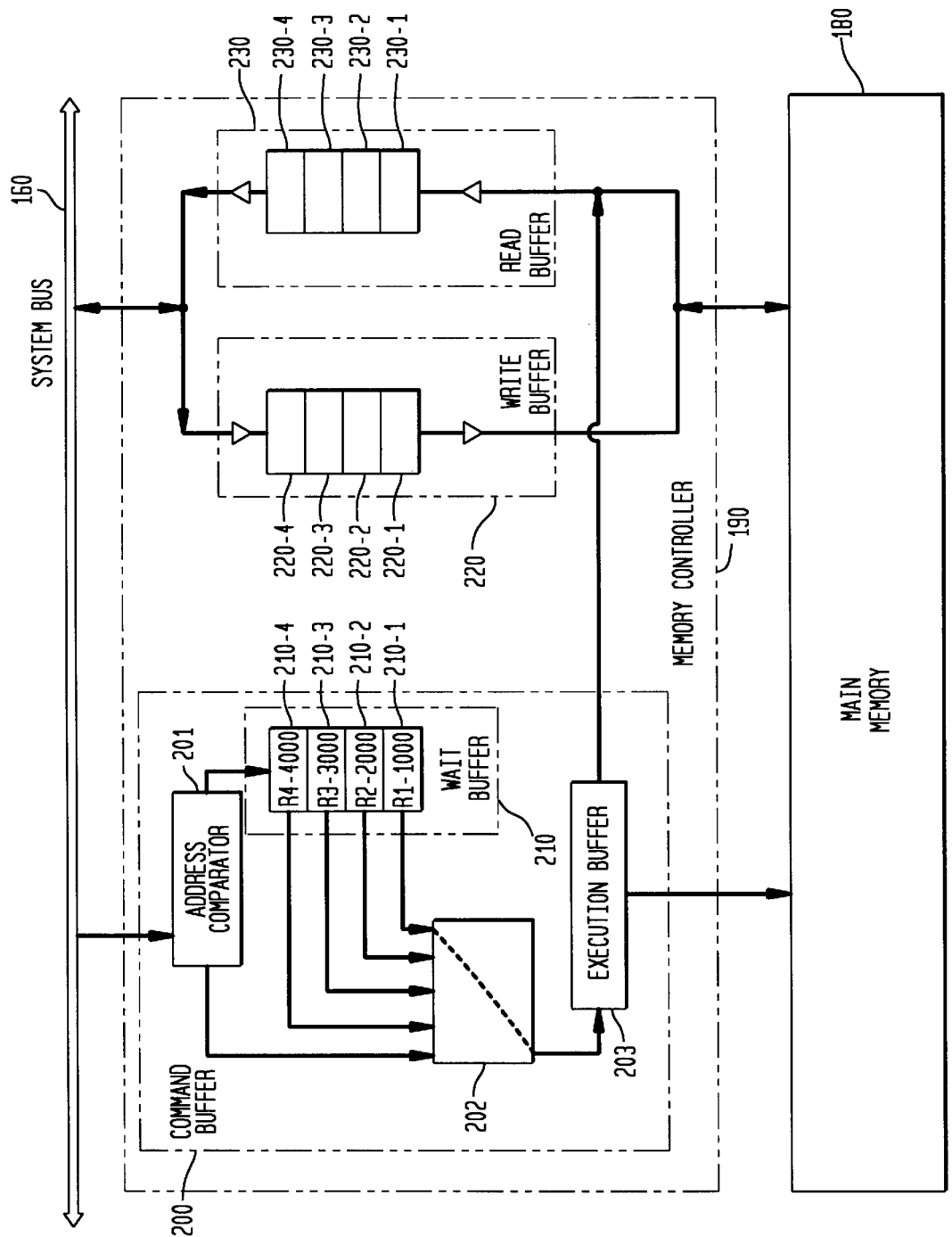
FIG. 14 shows a memory controller switching scenario according to the present invention that involves read statements with no matching addresses.

FIG. 14 shows a scenario where the first three commands R1, R2 and R3 are all read commands with no matching addresses. In this scenario, the first three commands R1, R2, and R3 in the wait buffer 210 are shown in wait buffer slots 210-1, 210-2, and 210-3 respectively. As shown in FIG. 14, the three read commands R1, R2, and R3 have dissimilar addresses. Command R1 has address 1000, R2 has address 2000, and R3 has address 3000. A forth read command R4, having address 4000, is input from the system bus 160 into the address comparator 201 and is then placed in wait buffer slot 210-4. The address comparator 201, compares the types and the addresses of each command in the wait buffer with the newly received command R4 and sends indications of the results of the comparison to select logic switch 202. The select logic switch 202, having been informed of the results of comparing the various types and addresses of the commands, detects that none of the addresses of the commands match and that all of the commands R1, R2, R3 and R4 are of the same type. The logic switch 202 therefore transfers (dashed line) the read command R1 and address in wait buffer slot 210-1 to the execution buffer 203. When the wait buffer 210 has all read commands with dissimilar addresses, the logic used by the select logic switch 202 is simply first-in, first-out (FIFO) which is also know as the strictly-in-order sequence.

Figure 15:
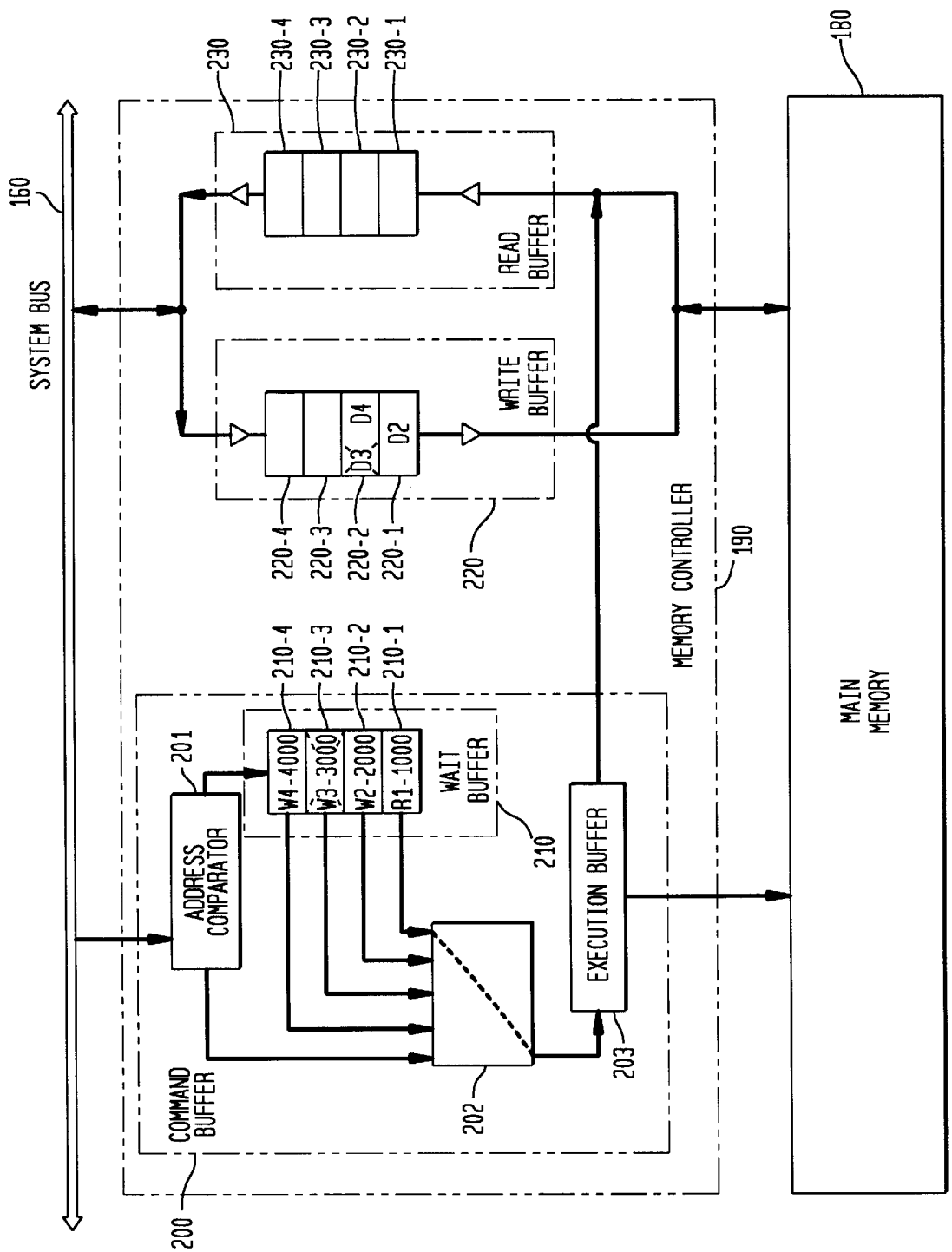
FIG. 15 shows a memory controller switching scenario that involves a write statement that hits a modified cache line.

Advantageously, the above schemes of operation are modified as follows to accord with the snooping/snarfing memory consistency scheme. Consider the memory controller 190 state depicted in FIG. 15. Two commands, R1 and W2, are pending in the wait buffer 210 when a newly issued command W3 is received. (Note that data D2 in write buffer 220 corresponds to command W2 and data D3 corresponds to command W3). Suppose command W3 is issued by a first master, e.g., I/O device 140, for writing D3 in a modified data line currently owned by a second master, e.g., cache memory 130-1. The cache memory 130-1 issues an intervention command and then writes back the modified data line with command W4, D4. The intervention command is detected by the address comparator 201 which deletes the command W3 and the data D3. The I/O device 140 can then reissue its write command at a later time.

Figure 16:
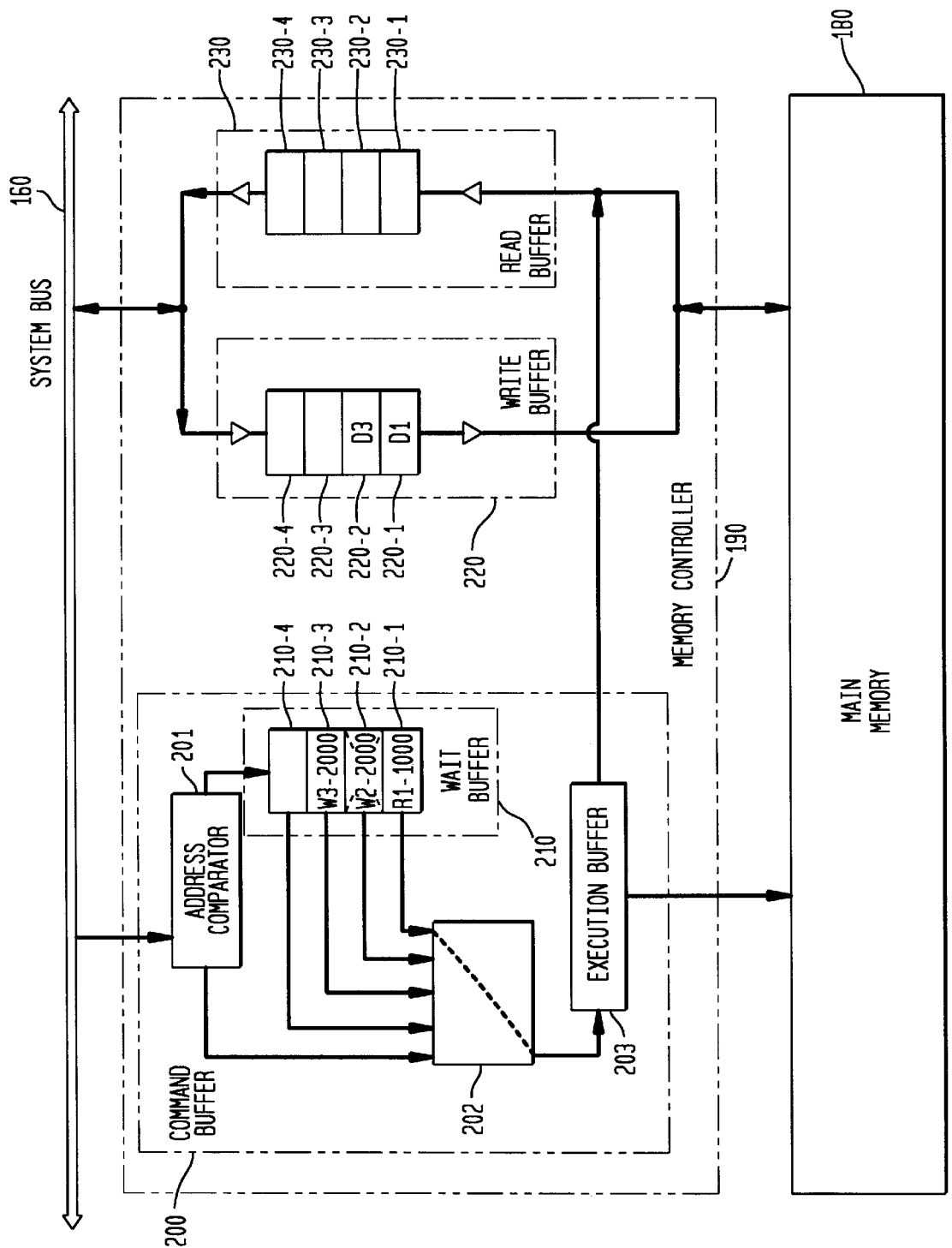
FIG. 16 shows a memory controller switching scenario that involves a read statement that hits a modified cache line.

In a second example, consider the memory controller 190 state shown in FIG. 16. A command W1 to write data D1 is pending in the wait buffer 210 and write buffer 220. Suppose a first master, e.g., the cache memory 130-1, issues a command R2 to read-out data of a modified data line that is currently owned by a second master, e.g., the cache memory 130-2. In response, cache memory 130-2 issues an intervention command and then issues a write command W3 to write back the data D3 to the main memory 180. The intervention command is detected by the address comparator 201 of the memory controller 190 which suspends the performance of the read-around-write. Instead, the address comparator 201 replaces the command R2 with W3. Note that the cache memory 130-1 can obtain the data D3 by a snarfing operation.

Finally, the invention has been described with reference to specific embodiments. However, this was only for purposes of illustrating the invention. Numerous alternative embodiments may be devised by those having ordinary skill in the art without departing from the spirit and scope of the following claims.

The invention claimed is:

1. A method for reading data from, and writing data into, a main memory comprising:

(a) receiving at a memory controller, a first command to write a first data at a first address of a memory, (b) storing said first data and said first command in a buffer of said memory controller after said step (a) but before writing said data of said first command into said memory, (c) after said step (b), receiving at said memory controller, from a master, a second command to read data from said first address of said memory, (d) combining said second command with said first command to form a combined command stored in said buffer, (e) executing said combined command in said buffer, thereby contemporaneously transferring to said master said first data stored in said buffer in said step (b), and transferring to said main memory said first data stored in said buffer in said step (b).

2. A method for reading data from, and writing data into, a main memory comprising:

(a) receiving at a memory controller, a first command to write a first data at a first address of a memory, (b) storing said first data and said first command in a buffer of said memory controller after said step (a) but before writing said data of said first command into said memory, (c) after said step (b), receiving at said memory controller, from a master, a second command to read data from said first address of said memory, (d) combining said second command with said first command to form a combined command stored in said buffer, (e) executing said combined command in said buffer, thereby contemporaneously transferring to said master said first data stored in said buffer in said step (b), and writing said first data into said memory at said first address prior to executing at least each other write command already received, but not yet executed by said memory controller.

3. A method for executing read and write types of data access commands on addresses of a memory comprising the steps of:

(a) receiving at a memory controller, from a master, a newly received command to access a first address of said memory, (b) comparing said address and the type of said newly received command to each other previously received command stored in a buffer of said memory controller pending execution, (c) if in said step (b), said newly received command is a read type of command, and one of said previously received commands stored in said buffer is a write type of command for writing particular data into said same first address to be accessed in performing said newly received command then combining said newly received read type of command with said one previously received command to form a combined read/write type of command stored in said buffer, and executing said combined read/write type of command prior to executing at least each other previously received write type of command stored in said buffer pending execution thereby:

(c1) writing said first data into said memory at said first address, and (c2) contemporaneous with said step (c1), transferring said particular data, obtained in said memory controller prior to said step (c1), to said master which issued said newly received command in said step (a).

4. The method of claim 3 further comprising the step of:

(d) if said newly received command is a write type of command and one of said previously received, pending commands is also a write type of command for accessing said same first address to be accessed in performing said newly received command, then aborting said one previously received, pending command.

5. The method of claim 4 wherein said newly received command and said aborted previously received command were issued by different masters.

6. The method of claim 4 wherein said newly received command and said aborted previously received command were issued by the same master.

7. The method of claim 3 further comprising the step of:

(e) if said newly received command is a read type of command and each of said previously received, pending commands is for accessing addresses other than said first address, then executing said newly received command before each of said previously received, pending commands which are write type of commands.

8. A memory controller for sequencing the execution of read and write commands on a memory, which read and write commands are received from one or more masters comprising:

at least one buffer for receiving a first command to write a first data at a first address of said memory, storing said first data and said first command therein after receiving said first command but before writing said data of said first command into said memory, and after storing said first data, receiving from a master a second command to read data from said first address of said memory, selection logic, for combining said second command with said first command stored in said at least one buffer to form a combined command stored in said at least one buffer and for selecting commands in said at least one buffer for execution, and an execution buffer for storing a command to be executed on said memory, said execution buffer cooperating with said selection logic and said memory such that said selection logic selects said combined command for transfer to said execution buffer for execution thereby causing said first data to be transferred to said master which issued said second command, and contemporaneously causing said first data to be transferred to said memory.

9. The memory controller of claim 8 wherein said selection logic also selects said combined command for transfer to said execution buffer so that said combined command is executed prior to executing each other write command already received and stored in said at least one buffer but not yet executed by said memory controller.

10. The memory controller of claim 9 wherein said at least one buffer receives commands from more than one master.

11. The memory controller of claim 10 wherein said masters are processors that issue said commands in the course of executing program instructions.

12. A computer system comprising:

a bus, at least one master connected to said bus, a memory, and a memory controller connecting said memory to said bus, said memory controller comprising:

at least one buffer for receiving a first command to write a first data at a first address of said memory, storing said first data and said first command therein after receiving said first command but before writing said data of said first command into said memory, and after storing said first data, receiving from one of said masters a second command to read data from said first address of said memory, and selection logic, for combining said second command with said first command stored in said at least one buffer to form a combined command stored in said at least one buffer and for causing said combined command to be transferred from said at least one buffer for execution thereby causing said first data stored in said at least one buffer to be transferred to said one master which issued said second command and contemporaneously causing said first data to be transferred to said memory before executing at least any write commands previously received by said buffer but still pending in said buffer.

13. The computer system of claim 12 wherein at least one of said at least one masters is a processor.

14. The computer system of claim 12 wherein at least one of said at least one masters is a cache memory.

15. The computer system of claim 12 wherein at least one of said masters is a SCSI controller.

* * * * *